United States Patent
Yamamoto et al.

(10) Patent No.: US 7,587,677 B2
(45) Date of Patent: Sep. 8, 2009

(54) WORKFLOW MANAGEMENT APPARATUS AND METHOD

(75) Inventors: Kensaku Yamamoto, Saitama (JP); Satoshi Imago, Kanagawa (JP); Hiroyasu Kurose, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 487 days.

(21) Appl. No.: 10/921,340

(22) Filed: Aug. 19, 2004

(65) Prior Publication Data

US 2005/0091600 A1    Apr. 28, 2005

(30) Foreign Application Priority Data

Aug. 26, 2003  (JP)  ............................. 2003-301777
Aug. 9, 2004   (JP)  ............................. 2004-232296

(51) Int. Cl.
*G06F 3/00* (2006.01)

(52) U.S. Cl. ...................................... 715/752; 709/206
(58) Field of Classification Search ................. 715/752; 709/206
See application file for complete search history.

(56) References Cited

U.S. PATENT DOCUMENTS

| | | | |
|---|---|---|---|
| 5,119,490 A | | 6/1992 | Kurose |
| 5,680,612 A | | 10/1997 | Asada et al. |
| 6,065,012 A | * | 5/2000 | Balsara et al. .............. 707/102 |
| 7,089,287 B2 | * | 8/2006 | Bellotti et al. .............. 709/206 |
| 7,222,156 B2 | * | 5/2007 | Gupta et al. ................ 709/206 |
| 2002/0111989 A1 | * | 8/2002 | Ambler et al. .............. 709/202 |
| 2003/0097361 A1 | * | 5/2003 | Huang et al. .................. 707/10 |
| 2003/0129940 A1 | * | 7/2003 | Rehbein et al. .............. 454/276 |
| 2003/0135558 A1 | * | 7/2003 | Bellotti et al. .............. 709/206 |
| 2003/0135565 A1 | * | 7/2003 | Estrada ........................ 709/206 |
| 2003/0156142 A1 | | 8/2003 | Nonaka et al. |
| 2003/0179241 A1 | * | 9/2003 | Nonaka et al. .............. 345/779 |
| 2003/0233419 A1 | * | 12/2003 | Beringer ....................... 709/206 |
| 2004/0006555 A1 | | 1/2004 | Yamamoto et al. |
| 2004/0122853 A1 | * | 6/2004 | Moore ..................... 707/103 R |
| 2005/0091600 A1 | | 4/2005 | Yamamoto et al. |

OTHER PUBLICATIONS

U.S. Appl. No. 11/561,070, filed Nov. 17, 2006, Oseto, et al.
Haruo Hayami, "Expanding Workflow Management System: 1,", IPSJ (Information Processing Society of Japan), vol. 39, No. 11, Nov. 1998, pp. 1160-1165 (with partial English translation).
Haruo Hayami, et al., "Expanding Workflow Management System: 2,", IPSJ Magazine, vol. 39, No. 12, Dec. 1998, pp. 1258-1263 (with partial English translation).
Haruo Hayami, "Expanding Workflow Management System: 3,", IPSJ Magazine, vol. 40, No. 5, May 1999, pp. 507-513, (with partial English translation).

(Continued)

*Primary Examiner*—Ba Huynh
*Assistant Examiner*—Kim-Lynn Dam
(74) *Attorney, Agent, or Firm*—Oblon, Spivak, McClelland, Maier & Neustadt, P.C.

(57) ABSTRACT

A computer-readable recording medium is disclosed that stores a workflow function addition program for causing a computer to execute a method including the steps of (a) displaying a list of work items on a screen related to an e-mail program and (b) changing the display state of the list displayed in step (a).

25 Claims, 24 Drawing Sheets

OTHER PUBLICATIONS

"Standards", http://www.wfmc.org/standards/standards.htm (Search date: Jul. 3, 2003, pp. 1-2).

David Hollingsworth, "Workflow Management Coalition, The Workflow Reference Model", The Workflow Management Coalition Specification, http://www.wfmc.org/standards/docs/tc003v11.pdf (search date Jul. 3, 2003), pp. 1-55, Jan. 19, 1995.

"Workflow Management Coalition Terminology & Glossary", The Workflow Management Coalition Specification, http://www.wfmc.org/standards/docs/TC-1011_term_glossary_v3.pdf (search date: Jul. 3, 2003), pp. 1-65, Feb. 1999.

* cited by examiner

FIG.5

| Folders | From | | Subject | Received |
|---|---|---|---|---|
| MUA<br>└ Local Folders<br>  ├ Inbox<br>  ├ Outbox<br>  ├ Sent Items<br>  ├ Deleted Items<br>  └ Drafts | ✉ | workflow | RE: XXX | 2003/07/01 12:01 |
| | ✉ | ohnuki | PCT APPLICATION | 2003/07/01 13:06 |
| | ✉ | somu | NOTICE OF SUSPENSION OF LAN & INTERNET FUNCTIONS | 2003/07/01 14:30 |
| | ✉ | workflow | RE: YYY | 2003/07/01 15:45 |
| | ✉ | murai | RE: SWITCH TO NEW PATENT SPECIFICATION FORMAT | 2003/07/01 16:03 |
| | ✉ | workflow | ZZZ APPLICATION | 2003/07/02 08:32 |

From:  To:
From:
Subject:

NO MESSAGE SELECTED.

---

WORK LIST

UNPROCESSED
2003/7/1  YAMADA  RE: XXX
2003/7/1  TANAKA  RE: YYY
2003/7/2  SUZUKI  ZZZ APPLICATION

PROCESSED
2003/6/25  TANAKA  xxx APPLICATION
2003/6/21  NAKATA  RE: yyy
2003/6/20  SUZUKI  zzz REQUEST

CREATOR(APPLICANT)

FIG.6

| WORK LIST |
|---|
| OVERDUE |
| 2003/7/1  YAMADA  RE: XXX |
| UNPROCESSED |
| 2003/7/1  TANAKA  RE: YYY<br>2003/7/2  SUZUKI  ZZZ APPLICATION |
| PROCESSED |
| 2003/6/25  TANAKA  xxx APPLICATION<br>2003/6/21  NAKATA RE: yyy<br>2003/6/20  SUZUKI  zzz REQUEST |

FIG.7

| WORK LIST |
|---|
| UNPROCESSED |
| ★2003/7/1 YAMADA RE: XXX<br>2003/7/1 TANAKA RE: YYY<br>2003/7/2 SUZUKI ZZZ APPLICATION |
| PROCESSED |
| 2003/6/25 TANAKA xxx APPLICATION<br>2003/6/21 NAKATA RE: yyy<br>2003/6/20 SUZUKI zzz REQUEST |

FIG.8

| File | Edit | View | Tool | Message | Help |

Folders  ×

MUA
└─ Local Folders
   ├─ Inbox
   ├─ Outbox
   ├─ Sent Items
   ├─ Deleted Items
   └─ Drafts

| | From | Subject | Received |
|---|---|---|---|
| ✉ | workflow | RE: XXX | 2003/07/01 12:01 |
| ✉ | ohnuki | PCT APPLICATION | 2003/07/01 13:06 |
| ✉ | somu | NOTICE OF SUSPENSION OF LAN & INTERNET FUNCTIONS | 2003/07/01 14:30 |
| ✉ | workflow | RE: YYY | 2003/07/01 15:45 |
| ✉ | murai | RE: SWITCH TO NEW PATENT SPECIFICATION FORMAT | 2003/07/01 16:03 |
| ✉ | workflow | ZZZ APPLICATION | 2003/07/02 08:32 |

From:
Subject: RE: XXX

YAMADA ○○
「THANK YOU VERY MUCH IN ADVANCE.」
LINK:http://XXXXXXXXXXXXXXXXX

YAMAMOTO □□
「」

[ EXAMINE ]   [ DISAPPROVE ]

TANAKA ××

—31

WORK LIST

UNPROCESSED
2003/7/1  YAMADA RE: XXX
2003/7/1  TANAKA RE: YYY
2003/7/2  SUZUKI  ZZZ APPLICATION

PROCESSED
2003/6/25 TANAKA xxx APPLICATION
2003/6/21 NAKATA RE: yyy
2003/6/20 SUZUKI zzz REQUEST

CREATOR(APPLICANT)

FIG.11

From wf-system@mailsv.xxx.ricoh.co.jp Wed Jul 23 17:57:34 2003
Date: Wed, 23 Jul 2003 17:57:33 +0900
From: Work Flow System <wf-system@mailsv.xxx.ricoh.co.jp>
To: YAMAMOTO <yamamoto@mailsv.xxx.ricoh.co.jp>
Message-ID: <20030723175733.A2564@mailsv.xxx.ricoh.co.jp>
Mime-Version: 1.0
Content-Type: multipart/mixed; boundary"SUOF0GtieIMvvwua"
Content-Disposition: inline
Content-Transfer-Encoding: 7bit
Content-Length: 482
X-WF-Status: N
X-WF-Server: wf-server-1
X-WF-Limit: 2003/7/30
X-WF-ID: 10011
X-WF-UID: yamamoto@mailsv.xxx.ricoh.co.jp
X-WF-Creator: yamada@mailsv.xxx.ricoh.co.jp —SUOF0GtieIMvvwua
Content-Type: text/plain; charset=iso-2022-jp
Content-Disposition: inline
Content-Transfer-Encoding: 7bit

```
<process-template-List>
  <property>
    <title>TRAVEL EXPENSE APPLICATION</title>
  </property>
  <property>
    <title>PURCHASE APPLICATION</title>
  </property>
  <property>
    <title>PROPOSAL (A)</title>
  </property>
  <property>
    <title>PROPOSAL (B)</title>
  </property>
   ...
</process-template-List>
```

WORKFLOW MANAGEMENT APPARATUS AND METHOD

BACKGROUND OF THE INVENTION

1. Field of the Invention

The present invention relates generally to workflow management, and more particularly to a recording medium storing a workflow function addition program, a recording medium storing an e-mail program, a recording medium storing a workflow management program, a user terminal unit, a workflow management apparatus, a workflow processing method, and a workflow management method.

2. Description of the Related Art

In these years, a workflow system has become well known that manages and automates a flow of documents or information from one person to another, when multiple persons work via a network, so as to facilitate their work. Such a workflow system is disclosed, for example, in: Haruo Hayami; "Expanding Workflow Management System: 1," IPSJ (Information Processing Society of Japan) Magazine, Vol. 39, No. 11, pp. 1160-1165 (1998); Haruo Hayami, Toshiaki Sakaguchi and Ryoichi Shibuya; "Expanding Workflow Management System: 2," IPSJ Magazine, Vol. 39, No. 12, pp. 1258-1263 (1998); Haruo Hayami, Ryoichi Shibuya, Takao Suzuki, Junichi Ikoma, Yosuke Terashita, Naoki Ueno, Satoshi Kaneko and Kiyoshi Hayashi; "Expanding Workflow Management System: 3," IPSJ Magazine, Vol. 40, No. 5, pp. 507-513 (1999); "Standards,"<http://www.wfmc.org/standards/standards.htm> (search date: Jul. 3, 2003); "Workflow Management Coalition, The Workflow Reference Model, "<http://www.wfmc.org/standards/docs/tc003v11.pdf> (search date: Jul. 3, 2003); and "Workflow Management Coalition, Terminology & Glossary,"<http://www.wfmc.org/standards/docs/TC-1011_term_glossary_v3.pdf> (search date: Jul. 3, 2003).

According to the conventional workflow management system, notification of workflow-related processing is commonly made by e-mail. A workflow participant starts e-mail software, and confirms notification of workflow-related processing. Then, the workflow participant starts an application dedicated to a workflow management system, opens a screen for performing the workflow-related processing separately from the screen of the e-mail software, and performs operations for the workflow-related processing.

However, there is a problem in that the workflow-related processing is separated into the operation of starting the e-mail software and confirming a workflow-related notification mail and the operation of newly starting the application dedicated to the workflow management system and performing the operations for the workflow-related processing.

Further, notification messages from the workflow management system and general e-mail messages are treated equally on the screen of the e-mail software. Therefore, there is a problem in that if workflow-related notification messages are left unread, it is difficult to find those unread notification messages among a large number of received e-mail messages.

There is also a problem in that a user management system and/or a user authentication system for the workflow management system should be newly installed.

SUMMARY OF THE INVENTION

Accordingly, it is a general object of the present invention to provide workflow management in which the above-described disadvantages are eliminated.

A more specific object of the present invention is to provide a recording medium storing a workflow function addition program, a recording medium storing an e-mail program, a recording medium storing a workflow management program, a user terminal unit, a workflow management apparatus, a workflow processing method, and a workflow management method for making it possible to prevent forgetting to perform workflow-related processing and perform the workflow-related processing with efficiency.

The above objects of the present invention are achieved by a computer-readable recording medium storing a workflow function addition program for causing a computer to execute a method, the method including the steps of: (a) displaying a list of work items on a screen related to an e-mail program; and (b) changing a display state of the list of the work items displayed in step (a).

The above objects of the present invention are also achieved by a computer-readable recording medium storing an e-mail program for causing a computer to execute a method, the method including the steps of: (a) displaying a list of work items on a screen related to the e-mail program; and (b) changing a display state of the list of the work items displayed in step (a).

The above objects of the present invention are also achieved by a computer-readable recording medium storing a workflow management program for causing a computer to execute a method, the method including the steps of: (a) providing a form template included in an instance of a process related to a workflow in response to a request from a workflow function addition program to obtain the form template; and (b) recording a form instance including data entered by a user in response to a request from the workflow function addition program to record the form instance.

The above objects of the present invention are also achieved by a computer-readable recording medium storing a workflow management program for causing a computer to execute a method, the method including the steps of: (a) providing a form template included in an instance of a process related to a workflow in response to a first e-mail message from an e-mail program, the first e-mail message requesting obtaining of the form template; and (b) recording a form instance including data entered by a user in response to a second e-mail message from the e-mail program, the second e-mail message requesting recording of the form instance.

The above objects of the present invention are also achieved by a user terminal unit, including an e-mail part including a workflow function addition part configured to add a workflow-related function, wherein the workflow function addition part displays a list of work items on a screen related to the e-mail part.

The above objects of the present invention are also achieved by a user terminal unit, including an e-mail part including a work list processing part configured to perform processing related to a list of work items, wherein the work list processing part displays the list of the work items on a screen related to the e-mail part.

The above objects of the present invention are also achieved by a workflow management apparatus, including a workflow management part configured to manage a process related to a workflow, wherein the workflow management part provides a form template included in an instance of the workflow-related process in response to a request from a workflow function addition part of a user terminal unit to obtain the form template, and the workflow management part records a form instance including data entered by a user in response to a request from the workflow function addition part to record the form instance.

The above objects of the present invention are also achieved by a workflow management apparatus, including a workflow management part configured to manage a process related to a workflow, wherein in response to a first e-mail message received from a transmission server for e-mail transmission, the first e-mail message requesting obtaining of a form template, the workflow management part transmits a second e-mail message including the form template to the transmission server, the form template being included in an instance of the workflow-related process.

The above objects of the present invention are also achieved by a method of processing a workflow in a user terminal unit including an e-mail part and a workflow function addition part, the method including the steps of: (a) the workflow function addition part displaying a list of work items on a screen related to the e-mail part; and (b) the workflow function addition part changing a display state of the list of the work items displayed in step (a).

The above objects of the present invention are also achieved by a method of processing a workflow in a user terminal unit including an e-mail part, the e-mail part including a work list processing part performing processing related to a list of work items, the method including the steps of: (a) the work list processing part displaying the list of the work items on a screen related to the e-mail part; and (b) the work list processing part changing a display state of the list of the work items displayed in step (a).

The above objects of the present invention are also achieved by a method of managing a workflow in a workflow management apparatus managing a process related to the workflow, the method including the steps of: (a) providing a form template included in an instance of the workflow-related process in response to a request from a workflow function addition part of a user terminal unit to obtain the form template; and (b) recording a form instance including data entered by a user in response to a request from the workflow function addition part to record the form instance.

The above objects of the present invention are also achieved by a method of managing a workflow in a workflow management apparatus managing a process related to the workflow, the method including the steps of: (a) providing a form template included in an instance of the workflow-related process in response to a first e-mail message from an e-mail part of a user terminal unit, the first e-mail message requesting obtaining of the form template; and (b) recording a form instance including data entered by a user in response to a second e-mail message from the e-mail part, the second e-mail message requesting recording of the form instance.

According to the present invention, it is possible to prevent forgetting to perform workflow-related processing, and it is possible to perform workflow processing with efficiency.

BRIEF DESCRIPTION OF THE DRAWINGS

Other objects, features and advantages of the present invention will become more apparent from the following detailed description when read in conjunction with the accompanying drawings, in which:

FIG. 5 is a diagram for illustrating a work list display screen of a MUA according to the first embodiment of the present invention;

FIG. 6 is a diagram for illustrating a work list display considering a time limit according to the first embodiment of the present invention;

FIG. 7 is a diagram for illustrating another work list display considering a time limit according to the first embodiment of the present invention;

FIG. 8 is a diagram for illustrating a work item processing region display on a screen of the MUA according to the first embodiment of the present invention;

FIG. 11 is a diagram for illustrating a mail header according to the first embodiment of the present invention;

FIG. 13 is a diagram showing a data example of a process template list based on SOAP according to the first embodiment of the present invention;

DETAILED DESCRIPTION OF THE PREFERRED EMBODIMENTS

A description is given below, with reference to the accompanying drawings, of embodiments of the present invention.

First Embodiment

Figure 1:
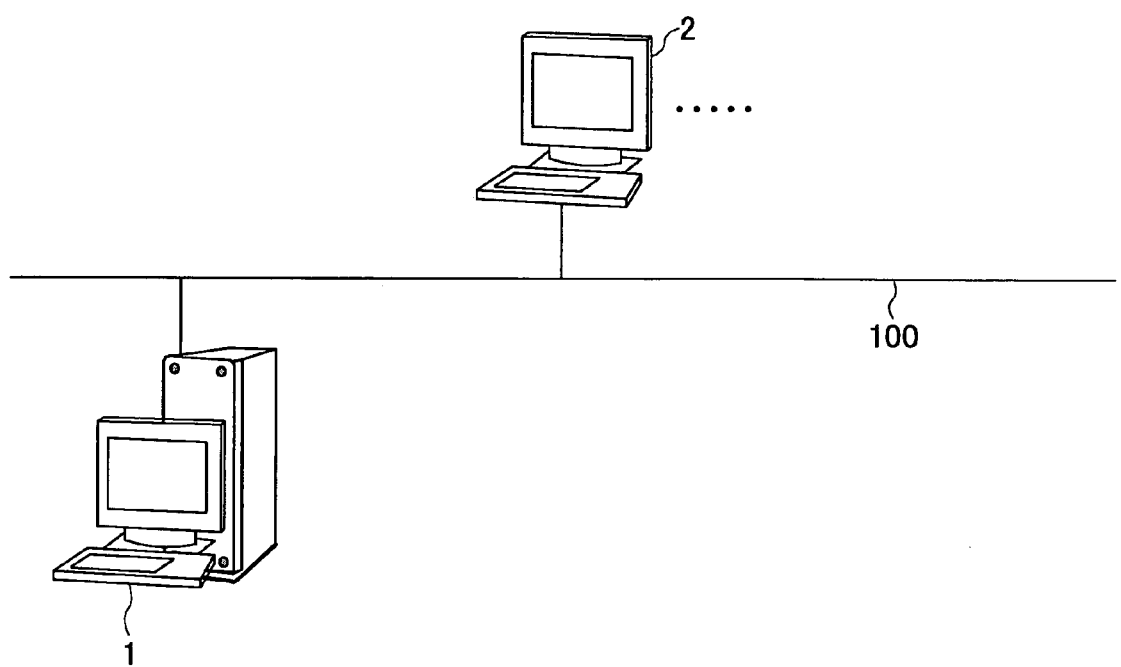
FIG. 1 is a diagram showing a system configuration according to a first embodiment of the present invention.

FIG. 1 is a diagram showing a system configuration according to a first embodiment of the present invention.

The system of FIG. 1 includes a workflow management server 1 and at least one client PC 2, which are connected via a network 100.

The workflow management server 1 includes a POP (Post Office Protocol) server 3, an SMTP (Simple Mail Transfer Protocol) server 4, a workflow management system 5, a workflow DB (database) 6, a mail DB 7, and an authentication DB 8, which are described below with reference to FIG. 4, and performs workflow-related processing.

The client PC 2 includes e-mail software (hereinafter also referred to as an MUA [Mail User Agent] for simplification of description) 9 and a below-described workflow function addition module 10 incorporated in the MUA 9. The workflow function addition module 10 displays a work list and a region for processing a work item on the screen of the MUA 9. Here, the work item refers to a step forming a workflow-related process which step should be executed by a workflow participant at that point. The work list is a list of such work items. The process is the flow of a series of work operations related to, for example, a document.

As shown in below-described second and fourth embodiments, the client PC 2 may include a dedicated MUA 14 of workflow in which the function of the workflow function addition module 10 is provided from the beginning.

The POP server 3, the SMTP server 4, the workflow management system 5, the workflow DB 6, the mail DB 7, and the authentication DB 8 do not always have to be included in the same server. In the following description, however, it is assumed for simplification of description that all of the above-described elements 3 through 8 are included in the workflow management server 1 unless otherwise specified.

Figure 2:
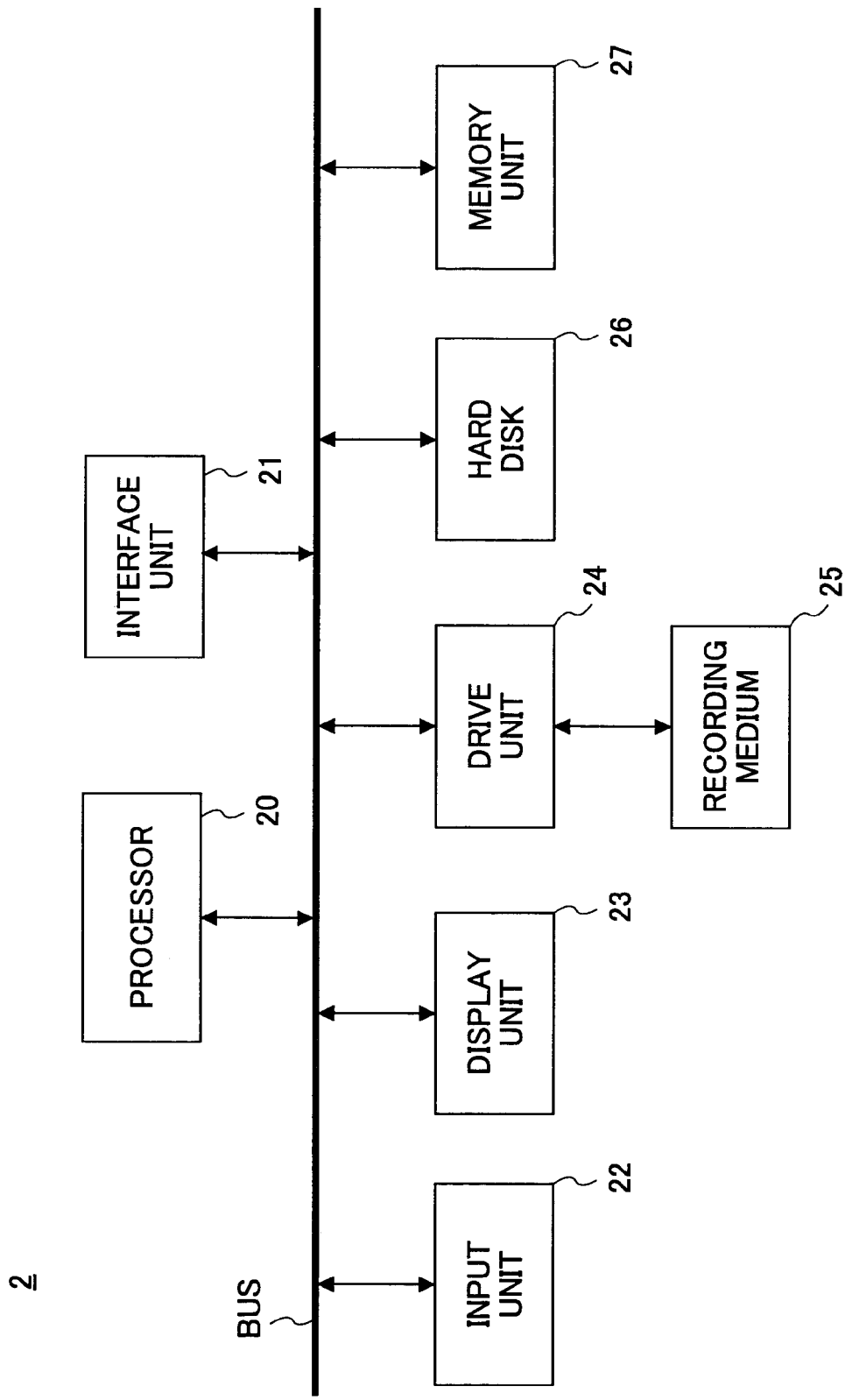
FIG. 2 is a block diagram showing a hardware configuration of a client PC according to the first embodiment of the present invention.

A description is given below, with reference to FIG. 2, of a hardware configuration of the client PC 2. FIG. 2 is a block diagram showing the hardware configuration of the client PC 2.

Referring to FIG. 2, the hardware configuration of the client PC 2 includes an input unit 22, a display unit 23, a drive unit 24, a hard disk 26, a memory unit 27, a processor 20, and an interface unit 21, which are connected to one another via a bus.

The input unit 22 includes a keyboard and a mouse for operating the client PC 2, and is used to input a variety of operations signals to the client PC 2. The display unit 23 displays a variety of windows and data necessary to operate the client PC 2. The interface unit 21 is an interface for connecting the client PC 2 to the network 100 and connecting other apparatuses to the client PC 2. The interface unit 21 is composed of, for example, a NIC (Network Interface Card), a modem, and a USB (Universal Serial Bus).

Programs such as a program for causing the client PC 2 to operate and programs corresponding to the MUA 9, the workflow function addition module 10, and the dedicated MUA 14 (FIGS. 18 and 22) are provided through a recording medium 25 such as a CD-ROM or downloaded through the network 100. The recording medium 25 is set in the drive unit 24 so that data, programs, and the programs corresponding to the MUA 9, the workflow function addition module 10, and the dedicated MUA 14 are installed in the hard disk 26 from the recording medium 25 through the drive unit 24. Alternatively, those programs including the programs corresponding to the MUA 9, the workflow function addition module 10, and the dedicated MUA 14 may be preinstalled in the client PC 2.

The hard disk 26 stores the data, the programs, and the programs corresponding to the MUA 9, the workflow function addition module 10, and the dedicated MUA 14. The hard disk 26 also stores, for example, received e-mail messages, lists of work items, and form templates. When the client PC 2 is started, the memory unit 27 reads out the programs including those corresponding to the MUA 9, the workflow function addition module 10, and the dedicated MUA 14 from the hard disk 26, and stores the read-out programs. The processor 20 performs processing in accordance with those programs stored in the memory unit 27.

Figure 3:
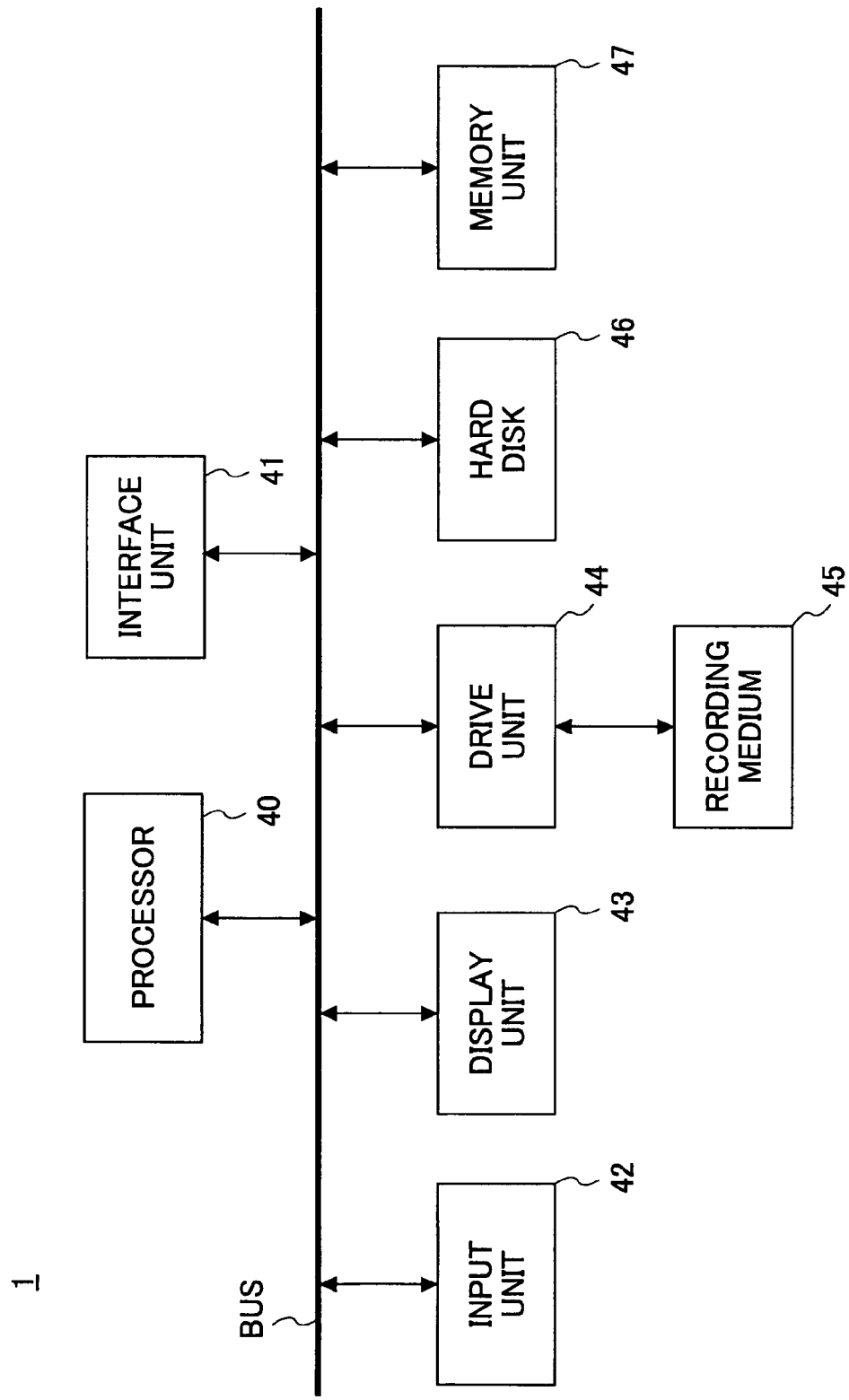
FIG. 3 is a block diagram showing a hardware configuration of a workflow management server according to the first embodiment of the present invention.

Next, a description is given, with reference to FIG. 3, of a hardware configuration of the workflow management server 1. FIG. 3 is a block diagram showing the hardware configuration of the workflow management server 1.

Referring to FIG. 3, the hardware configuration of the workflow management server 1 includes an input unit 42, a display unit 43, a drive unit 44, a recording medium 45, a hard disk 46, a memory unit 47, a processor 40, and an interface unit 41, which are connected to one another via a bus.

The input unit 42 includes a keyboard and a mouse for operating the workflow management server 1, and is used to input a variety of operations signals to the workflow management server 1. The display unit 43 displays a variety of windows and data necessary to operate the workflow management server 1. The workflow management server 1 may be configured without the input unit 42 and the display unit 43.

The interface unit 41 is an interface for connecting the workflow management server 1 to the network 100 and connecting other apparatuses to the workflow management server 1. The interface unit 41 is composed of, for example, a NIC, a modem, and a USB.

For example, a workflow management server program for operating the entire workflow management server 1 (or a workflow management system program and/or an SMTP server program and/or a POP server program for causing an individual system and/or server to operate) is provided through the recording medium 45 such as a CD-ROM or downloaded through the network 100. The recording medium 45 is set in the drive unit 44 so that data and the workflow management server program (or the workflow management system program and/or the SMTP server program and/or the POP server program for causing the individual system and/or server to operate) is installed in the hard disk 46 from the recording medium 45 through the drive unit 44. Alternatively, the workflow management server program (or the workflow management system program and/or the SMTP server program and/or the POP server program for causing the individual system and/or server to operate) may be preinstalled in the workflow management server 1.

The hard disk 46 stores the data and the workflow management server program (or the workflow management system program and/or the SMTP server program and/or the POP server program for causing the individual system and/or server to operate). The hard disk 46 also stores, for example, the workflow DB 6, the mail DB 7, and the authentication DB 8. When the workflow management server 1 is started, the memory unit 47 reads out the workflow management server program (or the workflow management system program and/or the SMTP server program and/or the POP server program for causing the individual system and/or server to operate) from the hard disk 46, and stores the workflow management server program (or the workflow management system program and/or the SMTP server program and/or the POP server program for causing the individual system and/or server to operate). The processor 40 performs processing in accordance with the workflow management server program (or the workflow management system program and/or the SMTP server program and/or the POP server program for causing the individual system and/or server to operate) stored in the memory unit 47.

Figure 4:
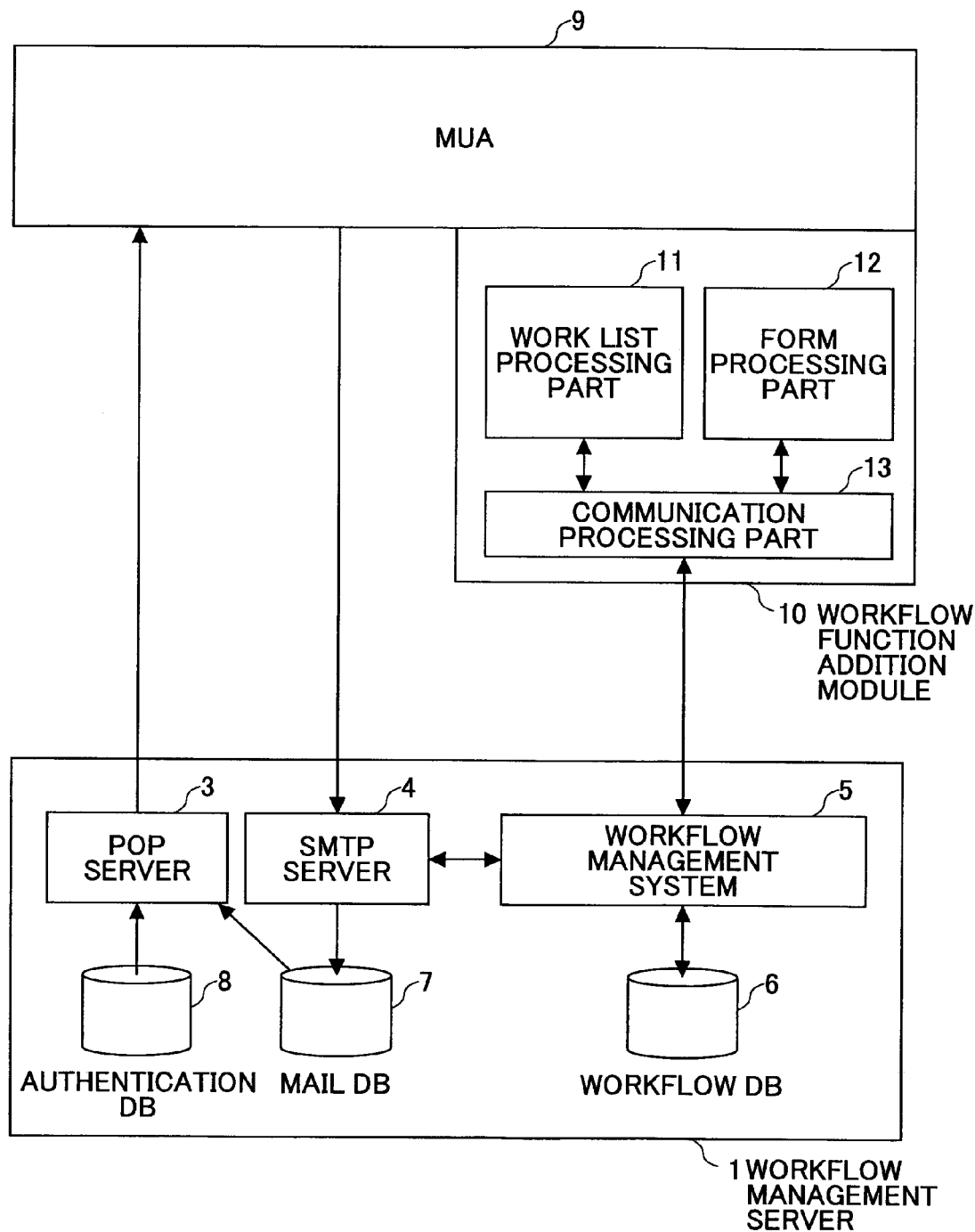
FIG. 4 is a block diagram showing a functional configuration of a system according to the first embodiment of the present invention.

Next, a description is given, with reference to FIG. 4, of a functional configuration of the system according to the first embodiment of the present invention. FIG. 4 is a block diagram showing the functional configuration of the system according to the first embodiment.

Referring to FIG. 4, the workflow management server 1 includes the POP server 3, the SMTP server 4, the workflow management system 5, the workflow DB 6, the mail DB 7, and the authentication DB 8.

The POP server 3 is a server for receiving e-mail messages. When the POP server 3 receives e-mail messages, the POP server 3 distributes the received e-mail messages to corresponding individual mail accounts, and stores the e-mail messages in the mail DB 7. In the case of receiving e-mail messages, a user of the MUA 9 gets connected to the POP server 3 using the MUA 9, and provides her/his account name and password to the POP server 3. The POP server 3 refers to the authentication DB 8 based on the account name provided by the MUA 9, and determines whether the account name and the password make a correct combination. If the POP server 3 determines that the account name and the password make a correct combination, the user of the MUA 9 extracts e-mail messages addressed to the user from the mail DB 7 using the MUA 9.

The POP server 3, which is described simply as "POP" in this specification, may be either a server corresponding to POP3, which is a mail reception protocol, or a server corresponding to IMAP4, which is another mail reception protocol. In the following, the POP server 3 is called POP for simplification of description.

The SMTP server 4 is a server for transmitting e-mail messages. When the SMTP server 4 receives an e-mail message transmitted from the MUA 9 of a contract user, the SMTP server 4 finds an operating SMTP server on the network of a destination user, and transfers the e-mail message thereto. In order to receive the e-mail message, the destination user calls a reception server (a POP server), and has the reception server transfer the e-mail message received by the SMTP server.

The workflow management system 5 is a management system that manages workflow-related processes. The workflow DB 6 stores, for example, information on workflow participants and the templates of the workflow-related processes.

For example, when the workflow management system 5 receives a process template list search request from the workflow function addition module 10, the workflow management system 5 searches the workflow DB 6, and provides the workflow function addition module 10 with a process template list that is the search result.

Further, as shown in FIG. 4, the client PC 2 includes the MUA 9 and the workflow function addition module 10. The workflow function addition module 10 includes a work list processing part 11, a form processing part 12, and a communication processing part 13.

As described above, the MUA 9 is e-mail software, and the workflow function addition module 10 is a module (plug-in) for performing workflow-related processing on the screen of the MUA 9.

The work list processing part 11 performs processing related to a list (work list) of steps (work items) of a workflow-related process which steps should be performed by a workflow participant at that point.

The form processing part 12 performs processing related to forms representing workflow-related user interfaces.

The communication processing part 13 performs communications with the workflow management system 5 of the workflow management server 1 based on a predetermined protocol (for example, SOAP [Simple Object Access Protocol]).

Next, a description is given, with respect to FIG. 5, of a work list display screen of the MUA 9. FIG. 5 is a diagram for illustrating the work list display screen of the MUA 9.

As shown in FIG. 5, the workflow function addition module 10 displays a work list on the screen of the MUA 9. For example, the user of the MUA 9 selects one work item from the column of unprocessed work items (UNPROCESSED column) of the work list displayed on the screen of the MUA 9, and processes the selected work item.

By displaying a work list on the screen of the MUA 9 as shown in FIG. 5, it is possible to prevent forgetting to perform workflow-related processing.

Next, a description is given, with reference to FIG. 6, of a work list display considering a deadline. FIG. 6 is a diagram for illustrating the work list display considering a time limit.

As shown in FIG. 6, work items past a time limit (overdue work items) may be displayed in a separate pane. As described below, the workflow function addition module 10 refers to a time limit indicated by X-WF-Limit included in a mail header, compares the time limit with the clock of the workflow function addition module 10 or the MUA 9, and displays an overdue work item in a separate pane.

By the workflow function addition module 10 displaying an overdue work item in a separate pane as shown in FIG. 6, it is possible to prevent the user of the MUA 9 from forgetting to process the overdue work item.

Next, a description is given, with reference to FIG. 7, of another work list display considering a time limit. FIG. 7 is a diagram for illustrating the other work list display considering a time limit.

As shown in FIG. 7, an overdue work item may be marked. As described below, the workflow function addition module 10 refers to a time limit indicated by X-WF-Limit included in a mail header, compares the time limit with the clock of the workflow function addition module 10 or the MUA 9, and marks the overdue work item.

By the workflow function addition module 10 marking an overdue work item as shown in FIG. 7, it is possible to prevent the user of the MUA 9 from forgetting to process the overdue work item.

Next, a description is given, with reference to FIG. 8, of a work item processing region display on the screen of the MUA 9. FIG. 8 is a diagram for illustrating the work item processing region display on the screen of the MUA 9.

As shown in FIG. 8, when the user of the MUA 9 selects one work item from a work list displayed on the screen of the MUA 9, the workflow function addition module 10 obtains a corresponding form template from the workflow management system 5, and displays a region 31 for processing the work item (a work item processing region) on the screen of the MUA 9.

By displaying the work item processing region 31 on the screen of the MUA 9 as shown in FIG. 8, it is possible to process a work item on the screen of the MUA 9 without dividing workflow-related processing.

Figure 9:
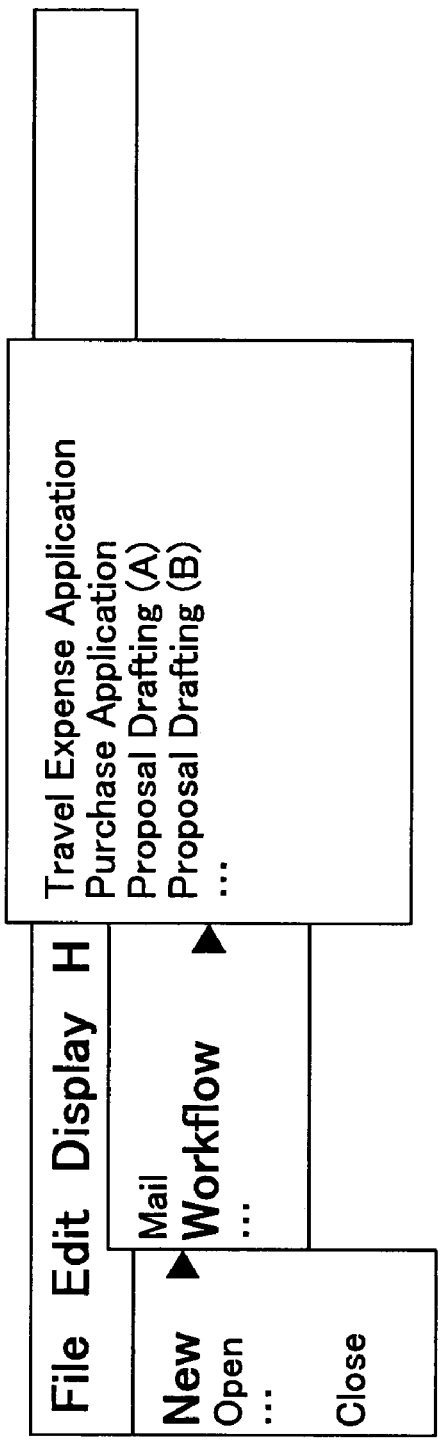
FIG. 9 is a diagram for illustrating a workflow start-related screen according to the first embodiment of the present invention.

Next, a description is given, with reference to FIG. 9, of a workflow start-related screen. FIG. 9 is a diagram for illustrating the workflow start-related screen.

As shown in FIG. 9, the user of the MUA 9, who is going to start a workflow, clicks on "New" on the "File" menu, and then clicks on "Workflow."

If it is determined that "Workflow" is clicked on by the user of the MUA 9, the workflow function addition module 10 transmits a workflow-related process template list search request to the workflow management system 5, and obtains a workflow-related template list from the workflow management system 5. Then, based on the workflow-related template list, the workflow function addition module 10 displays a list of workflow-related processes such as Travel Expense Application, Purchase Application, Proposal Drafting (A), and Proposal Drafting (B) as shown in FIG. 9.

The user of the MUA 9 selects a process that the user is going to start from the displayed workflow-related process list. If it is determined that the user of the MUA 9 has selected a process, the workflow function addition module 10 transmits a request to generate the instance of the process to the workflow management system 5.

As described with reference to FIG. 9, the user of the MUA 9 can select and start a workflow-related process using the MUA 9.

Figure 10:
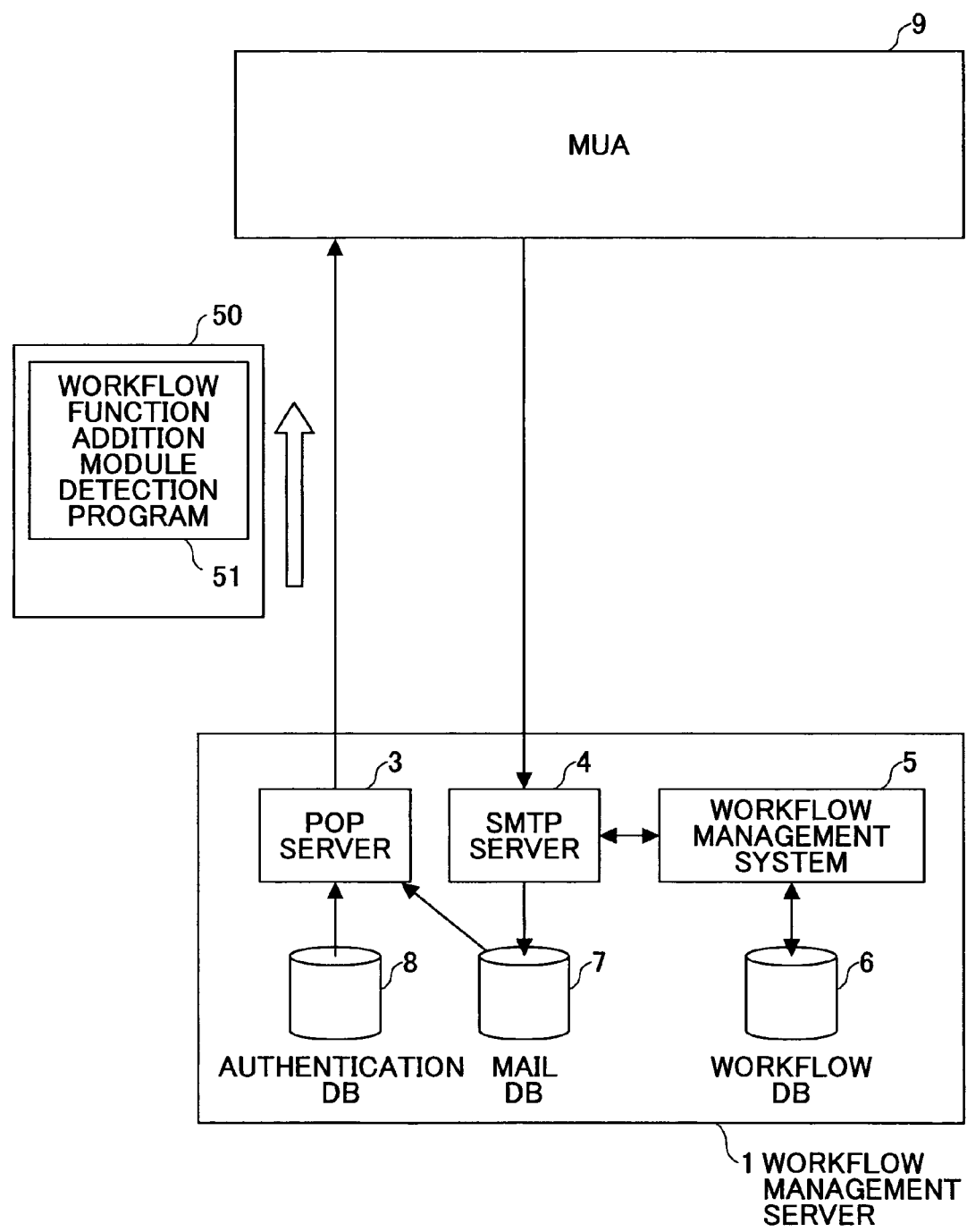
FIG. 10 is a diagram for illustrating processing in the case where a workflow function addition module is not incorporated in the MUA according to the first embodiment of the present invention.

Next, a description is given, with reference to FIG. 10, of processing in the case where the workflow function addition module 10 is not incorporated in the MUA 9. FIG. 10 is a diagram for illustrating the processing in the case where the workflow function addition module 10 is not incorporated in the MUA 9.

First, the workflow management server 1 transmits an e-mail message 50 including a workflow function addition module detection program 51 to the client PC 2.

The workflow function addition module detection program 51 is started by the MUA 9 of the client PC 2, and determines whether the workflow function addition module 10 is incorporated in the MUA 9.

If the workflow function addition module detection program 51 detects the workflow function addition module 10, the workflow function addition module detection program 51 returns an e-mail message to that effect to the workflow management server 1. On the other hand, if the workflow function addition module detection program 51 does not detect the workflow function addition module 10, the workflow function addition module detection program 51 returns an e-mail message to that effect (an error message) to the workflow management server 1.

When the workflow management server 1 receives the error message reporting that the workflow function addition module 10 is not detected from the workflow function addition module detection program 51, the workflow management server 1 transmits an e-mail message including the workflow function addition module 10 to the client PC 2.

By performing processing as shown in FIG. 10, the workflow management server 1 can determine whether the workflow function addition module 10 is incorporated in the MUA 9 of a workflow participant, and if the workflow function addition module 10 is not incorporated, the workflow function addition module 10 can be distributed and incorporated in the MUA 9.

The workflow function addition module detection program 51 may additionally include the function of detecting the version of the workflow function addition module 10. In this case, when the workflow function addition module detection program 51 detects the workflow function addition module 10, the workflow function addition module detection program 51 detects the version of the workflow function addition module 10, and returns an e-mail message to that effect, including the version of the workflow function addition module 10, to the workflow management server 1.

The workflow management server 1 determines the version of the workflow function addition module 10 included in the received e-mail message, and if the detected version is old, the workflow management server 1 transmits an e-mail message including the workflow function addition module 10 of the latest version to the client PC 2.

By performing such processing, when the workflow function addition module 10 is incorporated in the MUA 9 of a workflow participant, the workflow management server 1 can detect the version of the workflow function addition module 10, and if the detected version is old, the workflow management server 1 can update the version of the workflow function addition module 10 by distributing the workflow function addition module 10 of the latest version.

Next, a description is given, with reference to FIG. 11, of an example of the mail header of a workflow-related e-mail message. FIG. 11 is a diagram for illustrating the mail header. Below-described fields and/or values stored in the fields are added to the mail header by the workflow management system 5.

As shown in FIG. 11, the mail header of an e-mail message relating to a workflow includes two fields, X-WF-Status and X-WF-Limit, in order for the workflow function addition module 10 to perform work list-related processing.

X-WF-Status stores the status of a corresponding work item. For example, X-WF-Status stores N if the corresponding work item is unprocessed, and O if processed.

The workflow management server 1 initially stores N in X-WF-Status of an e-mail message, and transmits the e-mail message to the client PC 2 of a workflow participant. The workflow function addition module 10 refers to the status, and if the value of X-WF-Status is N, the workflow function addition module 10 displays a corresponding work item in the UNPROCESSED column of a work list. When the work item is processed by the user of the MUA 9 (workflow participant), the workflow function addition module 10 changes the value of X-WF-Status from N to O, and displays the work item in the PROCESSED column of the work list.

On the other hand, X-WF-Limit stores the processing time limit of a corresponding work item. For example, as described with reference to FIGS. 6 and 7, the workflow function addition module 10 refers to the time limit of a work item stored in X-WF-Limit, and compares the time limit with the clock of its own or the MUA 9. Then, the workflow function addition module 10 displays in a separate pane or marks an overdue work item.

Further, as shown in FIG. 11, the mail header of a workflow-related e-mail message also includes the four fields of X-WF-Server, X-WF-ID, X-WF-UID, and X-WF-Creator in order for the workflow function addition module 10 to perform form-related processing.

X-WF-Server stores the host name of a server including the workflow management system 5 (the workflow management server 1 in this embodiment). For example, the workflow function addition module 10 refers to a host name stored in X-WF-Server, and establishes connection with a server identified by the host name (the workflow management server 1 in this embodiment).

X-WF-ID stores a process ID identifying a workflow-related process. For example, the workflow function addition module 10 refers to a process ID stored in X-WF-ID, and obtains a form template for processing a process identified by the process ID at this step from the workflow management system 5.

X-WF-UID stores the user ID (mail account) of the user of the MUA 9.

X-WF-Creator stores the user ID (mail account) of an applicant (creator) who applies for the workflow.

Figure 12:
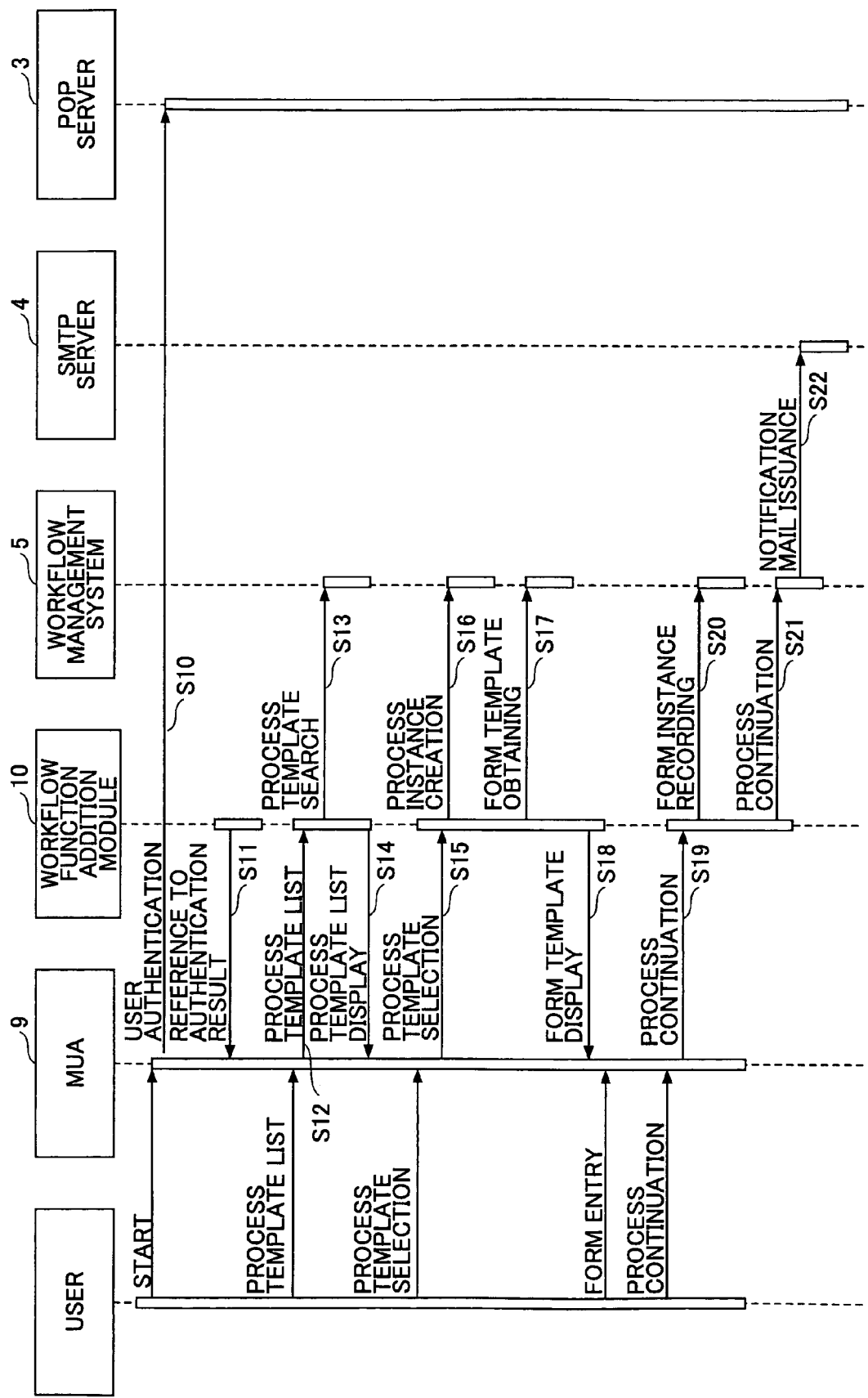
FIG. 12 is a sequence diagram of the start of a workflow according to the first embodiment of the present invention.

Next, a description is given, with reference to FIG. 12, of a sequence relating to the start of a workflow. FIG. 12 is a sequence diagram of the start of a workflow.

First, the user of the MUA 9 starts the MUA 9. Then, in step S10, the started MUA 9 transmits a user authentication request including a mail account to the POP server 3, and receives the authentication result.

When the MUA 9 receives the authentication result from the POP server 3, in step S11, the workflow function addition module 10 refers to the authentication result retained by the MUA 9, and employs the authentication result as the authentication result of its own.

By the workflow function addition module 10 employing authentication that the MUA 9 performs using a mail account as its own authentication, a workflow-related system can be constructed without installing a new user authentication system (server) in the system for workflow authentication.

Next, as described with reference to FIG. 9, the user of the MUA 9 clicks on "New" on the "File" menu on the screen of the MUA 9, and then clicks on "Workflow," thereby making a request to obtain a process template list. An example of the process template list is described below with reference to FIG. 14.

When the MUA 9 determines that the user has clicked on "Workflow" on the screen of the MUA 9, in step S12, the MUA 9 provides a workflow-related process template list search request to the workflow function addition module 10.

When the workflow function addition module 10 receives the process template list search request from the MUA 9, in step S13, the workflow function addition module 10 transmits a workflow-related process template list search request to the workflow management system 5.

When the workflow management system 5 receives the workflow-related process template list search request from the workflow function addition module 10, the workflow management system 5, in response to the request, searches the workflow DB 6, and provides a workflow-related process template list that is the search result to the workflow function addition module 10. Here, as described above, the workflow function addition module 10 performs communications with the workflow management system 5 based on, for example, SOAP. FIG. 13 shows a data example of the process template list transmitted from the workflow management system 5 to the workflow function addition module 10.

Then, in step S14, as described with reference to FIG. 9, the workflow function addition module 10 displays a list of workflow-related processes such as Travel Expense Application, Purchase Application, Proposal Drafting (A), and Proposal Drafting (B) on the screen of the MUA 9 based on the obtained workflow-related process template list.

Next, the user of the MUA 9 selects a process template by selecting a process that the user is going to start from the displayed workflow-related process list.

When in step S15, the workflow function addition module 10 determines through the MUA 9 that a process template has been selected by the user, in step S16, the workflow function addition module 10 transmits a request to generate the instance of the process template selected by the user of the MUA 9 to the workflow management system 5.

Receiving the request to generate the instance of the process template selected by the user of the MUA 9 from the workflow function addition module 10, the workflow management system 5 generates the instance of the selected process template in response to the request, and stores the generated instance in, for example, the workflow DB 6. An example of the process instance is described below with reference to FIG. 15.

Next, in step S17, the workflow function addition module 10 transmits to the workflow management system 5 a request to obtain a form template included in the instance of the process template generated by the generation request transmitted in step S16.

Receiving the form template obtaining request from the workflow function addition module 10, the workflow management system 5, in response to the request, obtains the form template included in the generated instance of the process template from, for example, the workflow DB 6, and provides the form template to the workflow function addition module 10.

Then, in step S18, the workflow function addition module 10 displays a region (screen) for process creation on the screen of the MUA 9 based on the obtained form template. The user of the MUA 9 enters data relating to process creation or start in the displayed region, and presses a CONTINUE PROCESS button or a TRANSMIT button, thereby requesting the continuation of the process.

In step S19, the workflow function addition module 10 receives the process continuation request from the user of the MUA 9 via the MUA 9, and in step S20, the workflow function addition module 10 transmits a request to record a form instance including the data entered by the user of the MUA 9 to the workflow management system 5.

Receiving the form instance recording request from the workflow function addition module 10, the workflow management system 5, in response to the request, records the obtained form instance in the corresponding process instance stored in, for example, the workflow DB 6.

Further, in step S21, the workflow function addition module 10 transmits a request to continue the process to the workflow management system 5.

Receiving the process continuation request from the workflow function addition module 10, in step S22, the workflow management system 5, in response to the request, issues a notification e-mail message relating to the processing of a corresponding work item to the SMTP server 4.

As shown in FIG. 12, the user of the MUA 9 can start a workflow using the screen of the MUA 9.

FIG. 13 is a diagram showing a data example of a process template list based on SOAP.

As shown in FIG. 13, the workflow function addition module 10 and the workflow management system 5 communicate with each other based on a predetermined protocol such as SOAP.

Figure 14:
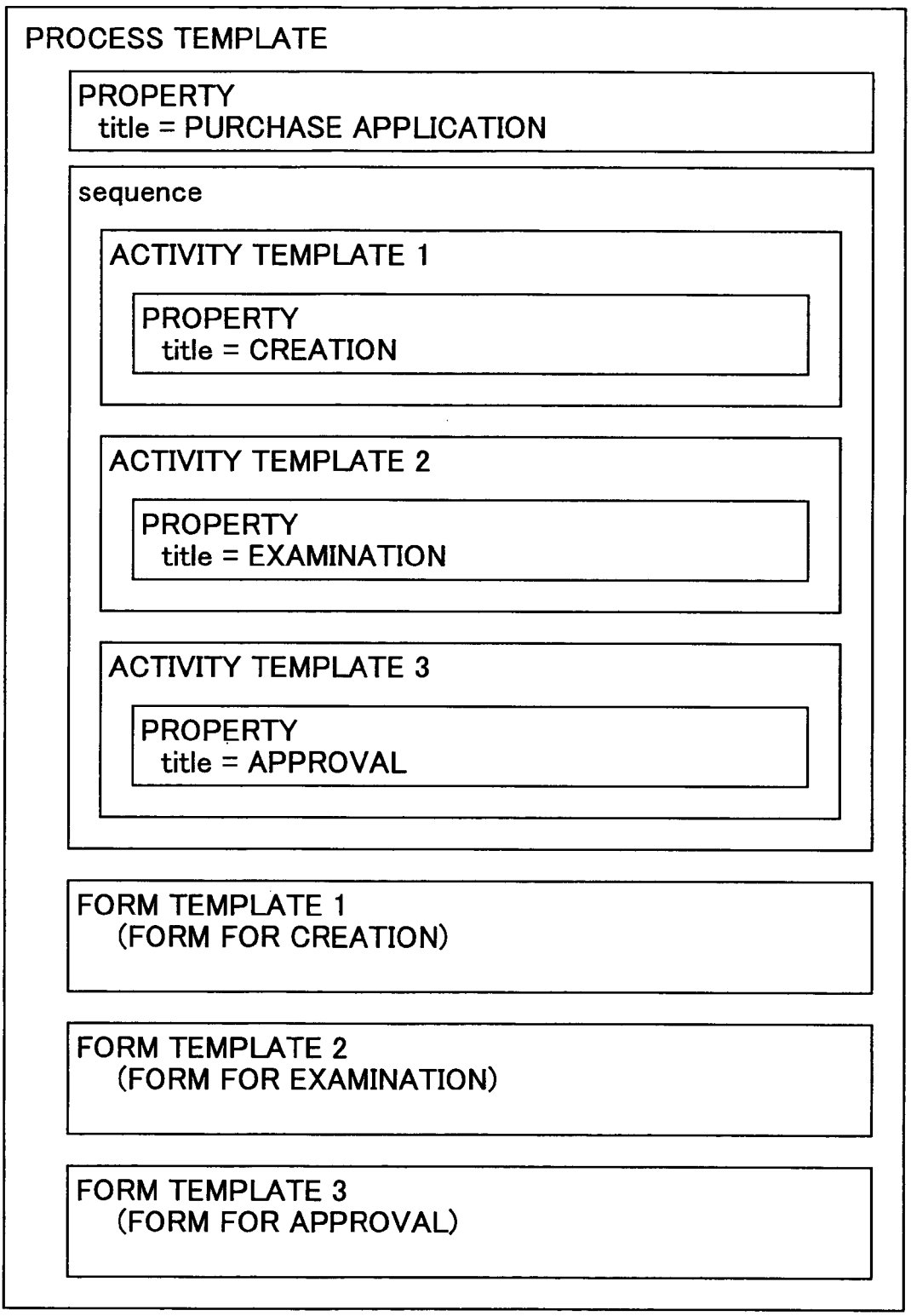
FIG. 14 is a diagram for illustrating a process template according to the first embodiment of the present invention.

Next, a description is given, with reference to FIG. 14, of a process template. FIG. 14 is a diagram for illustrating the process template.

It is determined from "title" included in a property that the process template shown in FIG. 14 is a template for a process relating to PURCHASE APPLICATION.

Further, the process template of FIG. 14 includes ACTIVITY TEMPLATE 1, ACTIVITY TEMPLATE 2, and ACTIVITY TEMPLATE 3 in an information item "sequence," defining that the activity of CREATION, the activity of EXAMINATION, and the activity of APPROVAL are performed in sequence. Here, the activities refer to the steps of a workflow. The relationship between an activity and a work item is that an activity processed by a person is a work item.

Further, the process template of FIG. 14 includes FORM TEMPLATE 1, FORM TEMPLATE 2, and FORM TEMPLATE 3. For example, the form of a screen for CREATION is defined in FORM TEMPLATE 1, the form of a screen for EXAMINATION is defined in FORM TEMPLATE 2, and the form of a screen for APPROVAL is defined in FORM TEMPLATE 3.

Figure 15:
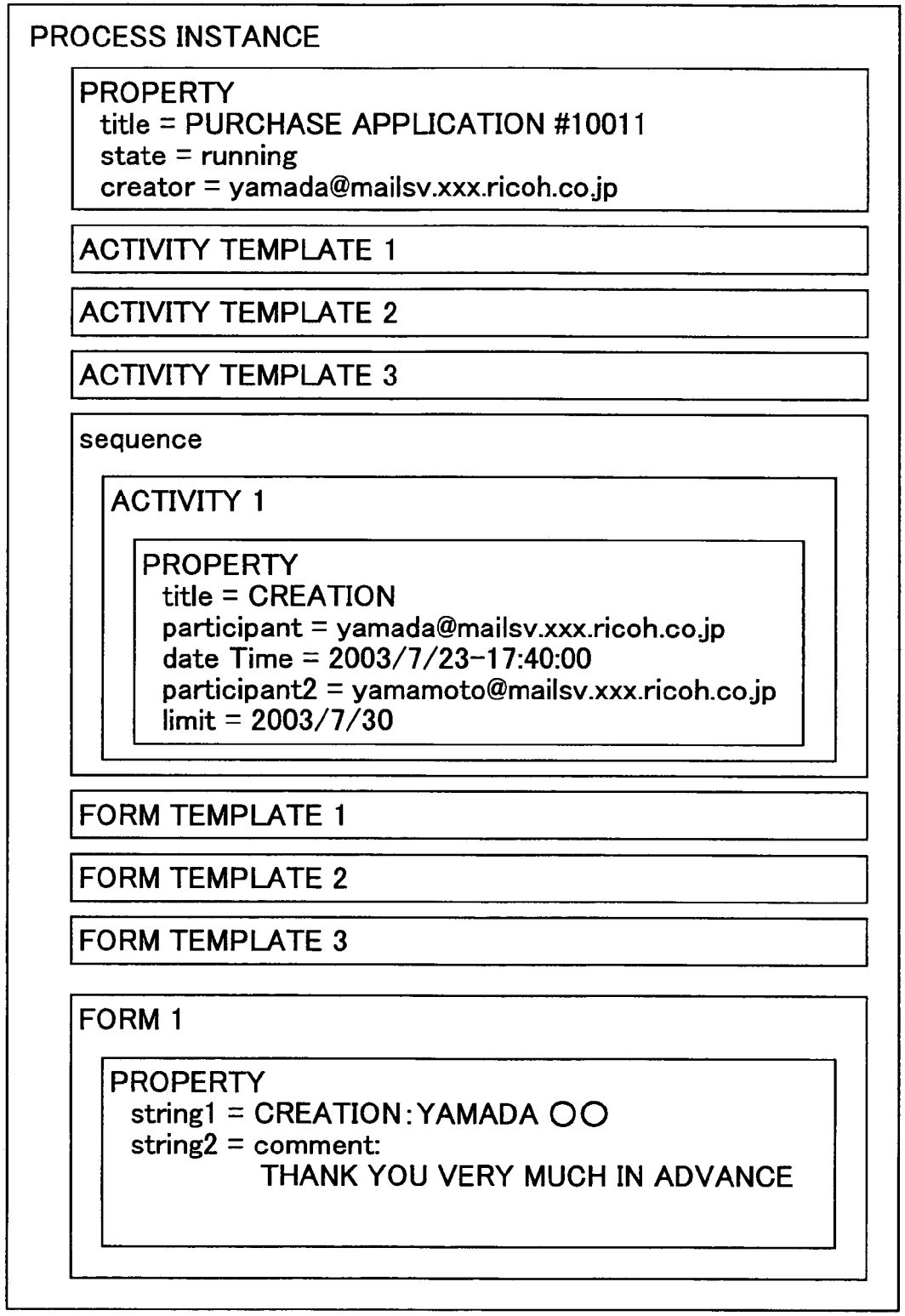
FIG. 15 is a diagram for illustrating a process instance according to the first embodiment of the present invention.

Next, a description is given, with reference to FIG. 15, of a process instance corresponding to the process template of FIG. 14. FIG. 15 is a diagram for illustrating the process instance. The process instance shown in FIG. 15 is an example of the process instance in which the form instance is entered in step S20 of the sequence of FIG. 12.

In contrast to the process template shown in FIG. 14, in the process instance of FIG. 15, a number is added to "title" and the user ID (mail account) of a workflow participant who has created the process instance is added as a creator as properties, for example.

As shown in FIG. 15, the process instance includes a copy of the entities of the activity templates so as to prevent the process from being affected even if the definition of the process is changed while the process is in progress.

Further, the process instance of FIG. 15 includes ACTIVITY 1 as an activity instance in an information item "sequence." In ACTIVITY 1, the user ID (mail account) of a workflow creator is added in "participant" as a property. In "date Time," the date and time of the creation of a workflow is added. Further, in "participant 2," the user ID (mail account) of a workflow participant (examiner) is added. A time limit by which the participant (examiner) should complete an examination is added as "limit."

As shown in FIG. 15, the process instance includes a copy of the entities of the form templates so as to prevent the process from being affected even if the definition of the process is changed while the process is in progress.

The process instance shown in FIG. 15 includes FORM 1 as a form instance. In FORM 1, the name of the workflow creator is added as a property in "string 1." Further, in "comment" of "string 2," a comment entered on the screen of the MUA 9 by the workflow creator is added.

Figure 16:
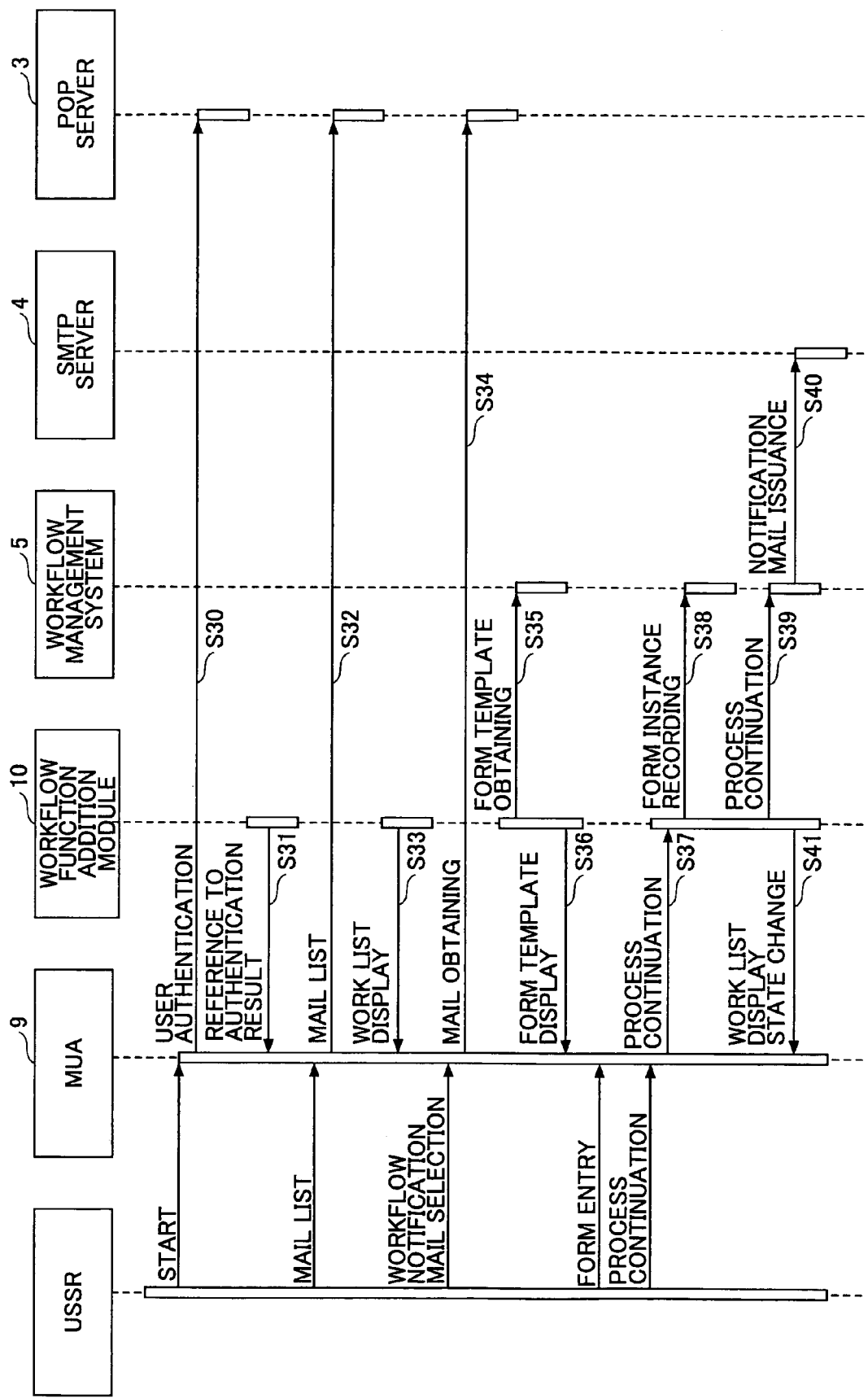
FIG. 16 is a sequence diagram of processing of a workflow according to the first embodiment of the present invention.

Next, a description is given, with reference to FIG. 16, of a sequence relating to the processing of a workflow. FIG. 16 is a sequence diagram of processing of the workflow.

First, the user of the MUA 9 starts the MUA 9. Then, in step S30, the started MUA 9 transmits a user authentication request including a mail account to the POP server 3, and receives the authentication result.

When the MUA 9 receives the authentication result from the POP server 3, in step S31, the workflow function addition module 10 refers to the authentication result retained by the MUA 9, and employs the authentication result as the authentication result of its own.

By the workflow function addition module 10 employing authentication that the MUA 9 performs using a mail account as its own authentication, a workflow-related system can be constructed without installing a new user authentication system (server) in the system for workflow authentication.

Next, the user of the MUA 9 makes a request to obtain a mail list. When the MUA 9 determines that the user of the MUA 9 has made a request to obtain a mail list, in step S32, the MUA 9 transmits a mail list obtaining request to the POP server 3, and obtains a mail list.

In step S33, as described with reference to FIGS. 5 through 7, the workflow function addition module 10 displays a work list on the screen of the MUA 9 based on the mail list obtained by the MUA 9. For example, the workflow function addition module 10 refers to a mail header obtained by the MUA 9 and stored in, for example, the hard disk 26, and determines whether a corresponding e-mail message is workflow-related. If the workflow function addition module 10 determines that the e-mail message is workflow-related, the workflow function addition module 10 displays a work list on the screen of the MUA 9 based on the information of the mail header.

The user of the MUA 9 selects a workflow-related e-mail message from the workflow management system 5 using the screen of the MUA 9.

In step S34, the MUA 9 transmits a request to obtain the workflow-related e-mail message selected by the user of the MUA 9 to the POP server 3, and obtains the corresponding e-mail message.

Next, in step S35, the workflow function addition module 10 transmits to the workflow management system 5 a request to obtain a form template corresponding to the workflow-related notification e-mail message obtained by the MUA 9.

Receiving the form template obtaining request from the workflow function addition module 10, the workflow management system 5, in response to the request, obtains the corresponding form template included in the instance of a corresponding process template from, for example, the workflow DB 6, and provides the obtained form template to the workflow function addition module 10.

In step S36, as described with reference to FIG. 8, the workflow function addition module 10 displays the work item processing region 31 on the screen of the MUA 9 based on the obtained form template.

The user of the MUA 9 enters a comment on the displayed region (screen) 31, processes a work item by clicking on an EXAMINE button or a DISAPPROVE button, and requests the continuation of the process.

When in step S37, the workflow function addition module 10 receives the process continuation request from the user of the MUA 9 via the MUA 9, in step S38, the workflow function addition module 10 transmits a request to record a form instance including the comment entered by the user to the workflow management system 5.

Receiving the form instance recording request from the workflow function addition module 10, the workflow management system 5, in response to the request, records the obtained form instance in the corresponding process instance stored in, for example, the workflow DB 6.

Further, in step S39, the workflow function addition module 10 transmits a request to continue the process to the workflow management system 5.

Receiving the process continuation request from the workflow function addition module 10, in step S40, the workflow management system 5, in response to the request, issues a notification e-mail message relating to the processing of a corresponding work item to the SMTP server 4.

On the other hand, in step S41, the workflow function addition module 10 changes the display state of the work list displayed on the screen of the MUA 9. For example, the workflow function addition module 10 moves a processed work item from the UNPROCESSED column to the PROCESSED column on the screen of the MUA 9, or deletes the processed work item from the work list.

By performing processing as shown in FIG. 16, the user of the MUA 9 can process a workflow using the screen of the MUA 9.

Figure 17:
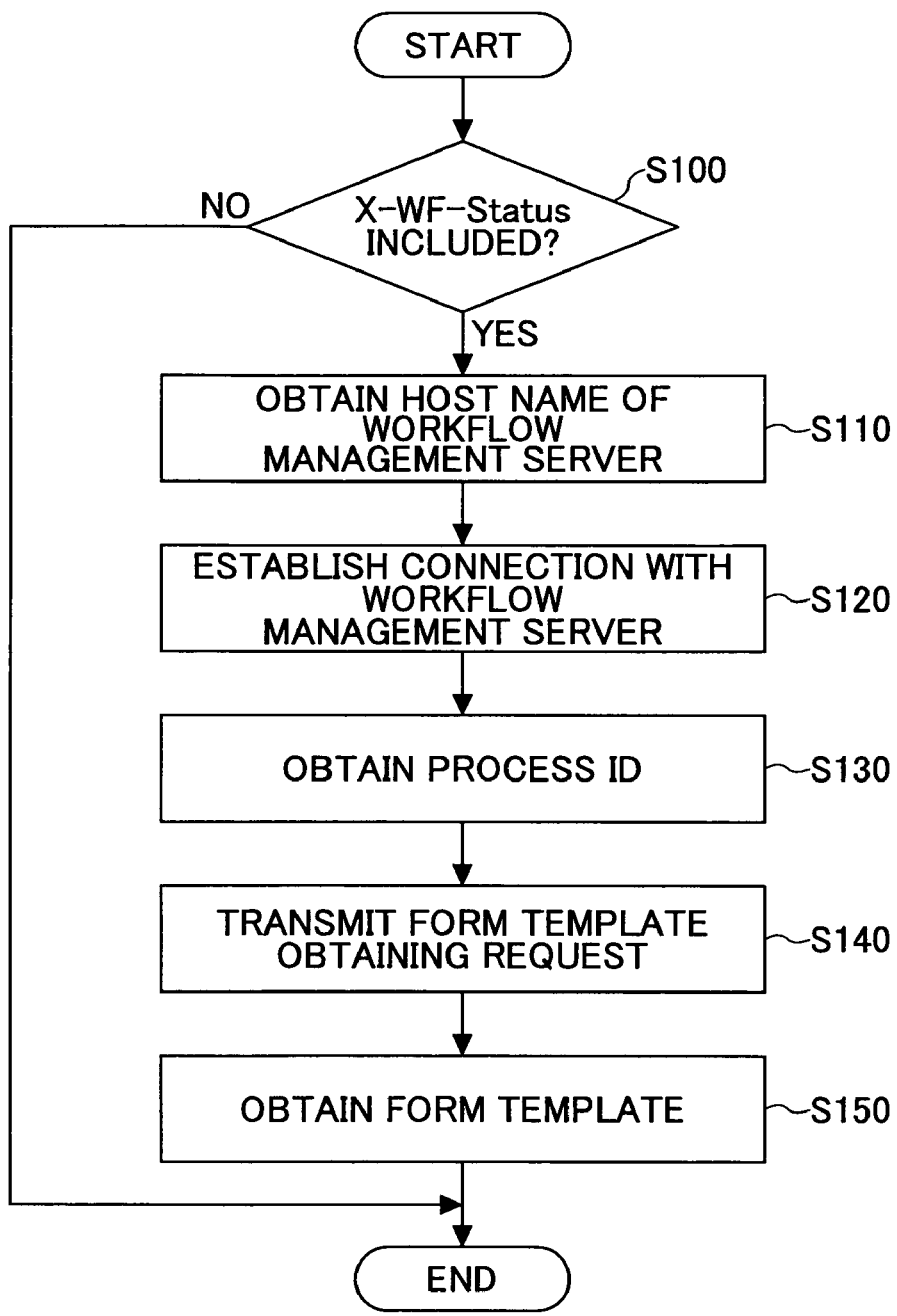
FIG. 17 is a flowchart for illustrating a form template obtaining request transmission operation according to the first embodiment of the present invention.

Next, a description is given, with reference to FIG. 17, of a form template obtaining request transmission operation. FIG. 17 is a flowchart for illustrating the form template obtaining request transmission operation.

In step S100 of FIG. 17, the workflow function addition module 10 determines whether the mail header of an e-mail message obtained by the MUA 9 includes the field of X-WF-Status shown in FIG. 11. If the workflow function addition module 10 determines that the mail header of the e-mail message obtained by the MUA 9 includes the field of X-WF-Status (that is, YES in step S100), the workflow function addition module 10 proceeds to step S11, and if the workflow function addition module 10 determines that the mail header of the e-mail message obtained by the MUA 9 does not include the field of X-WF-Status (that is, NO in step S100), the workflow function addition module 10 ends the operation.

In step S110, the workflow function addition module 10 obtains the host name of the workflow management server 1 from the field of X-WF-Server of the mail header of the e-mail message obtained by the MUA 9.

Then, in step S120, the workflow function addition module 10 establishes connection with the workflow management server 1 based on the host name obtained in step S110.

Next, in step S130, the workflow function addition module 10 obtains a process ID identifying a workflow-related process from the field of X-WF-ID of the mail header of the obtained e-mail message.

Next, in step S140, the workflow function addition module 10 transmits to the workflow management system 5 a request to obtain a form template corresponding to the obtained workflow-related notification e-mail message, the request including the process ID obtained in step S130.

Then, in step S150, the workflow function addition module 10 obtains the form template from the workflow management system 5.

By performing processing as shown in FIG. 17, the workflow function addition module 10 can obtain a form template corresponding to an e-mail message obtained by the MUA 9 from the workflow management system 5.

Second Embodiment

In the first embodiment, a description is given of the case of incorporating the workflow function addition module 10 in the common MUA 9. Alternatively, workflow-related processing may also be performed with efficiency by employing the MUA 14 dedicated to workflow processing (hereinafter also referred to as the dedicated MUA 14) including the work list processing part 11 and the form processing part 12 shown in FIG. 4 from the beginning.

Figure 18:
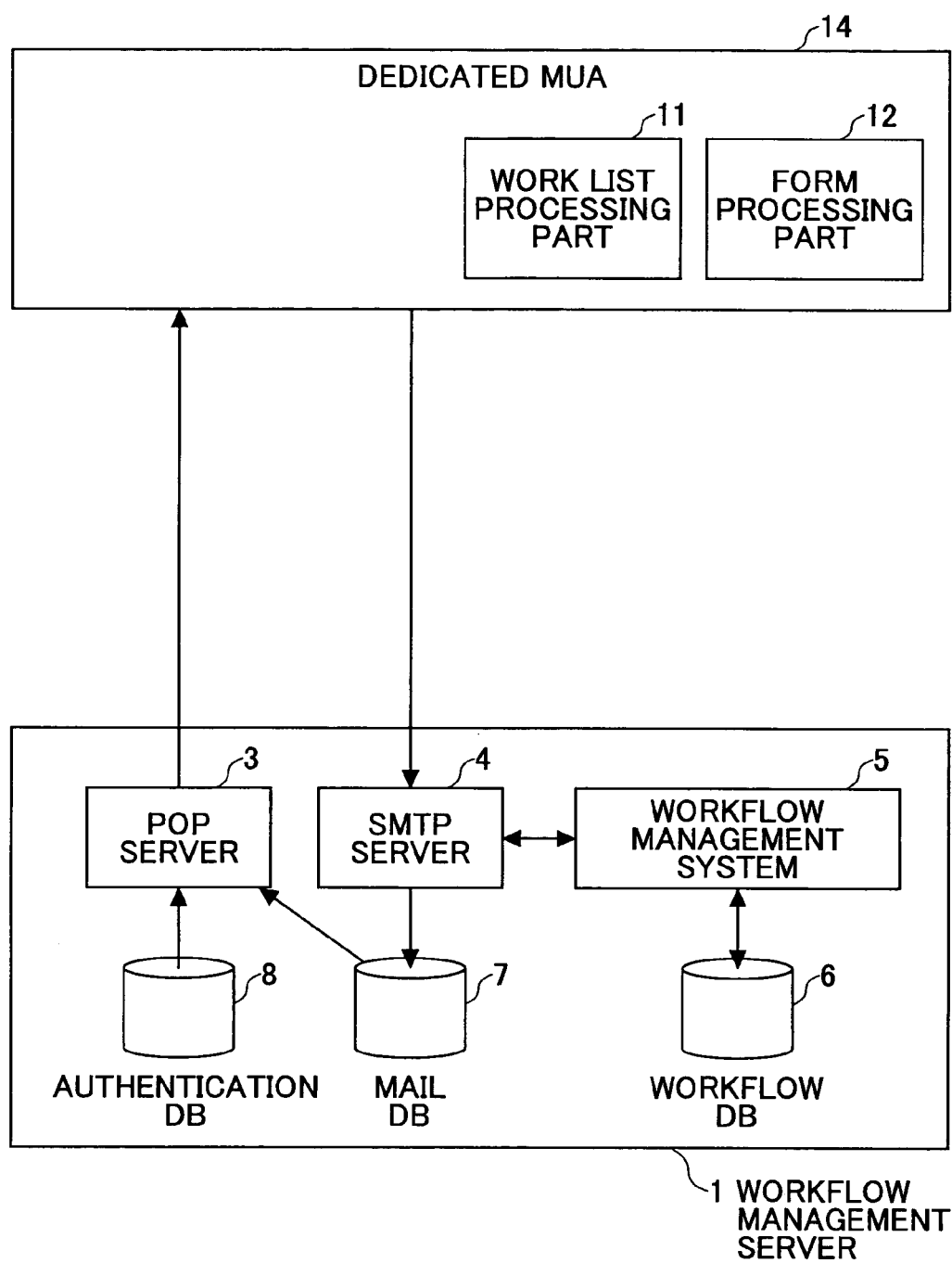
FIG. 18 is a block diagram showing a functional configuration of the system according to a second embodiment of the present invention.

Next, a description is given, with reference to FIG. 18, of a functional configuration of the system according to a second embodiment of the present invention. FIG. 18 is a block diagram showing the functional configuration of the system according to the second embodiment.

Referring to FIG. 18, the workflow management server 1 includes the POP server 3, the SMTP server 4, the workflow management system 5, the workflow DB 6, the mail DB 7, and the authentication DB 8.

When the workflow management system 5, for example, receives an e-mail message of a process template list search request from the dedicated MUA 14 via the SMTP server 4, the workflow management system 5 searches the workflow DB 6, and provides a process template list that is the search result to the dedicated MUA 14 via the SMTP server 4.

Further, as shown in FIG. 18, the client PC 2 includes the dedicated MUA 14, and the dedicated MUA 14 includes the work list processing part 11 and the form processing part 12. As described above, the dedicated MUA 14 is workflow-only e-mail software.

The work list processing part 11 performs processing related to a list (work list) of steps (work items) of a workflow-related process which steps should be performed by a workflow participant at that point.

The form processing part 12 performs processing related to forms representing workflow-related user interfaces.

Figure 19:
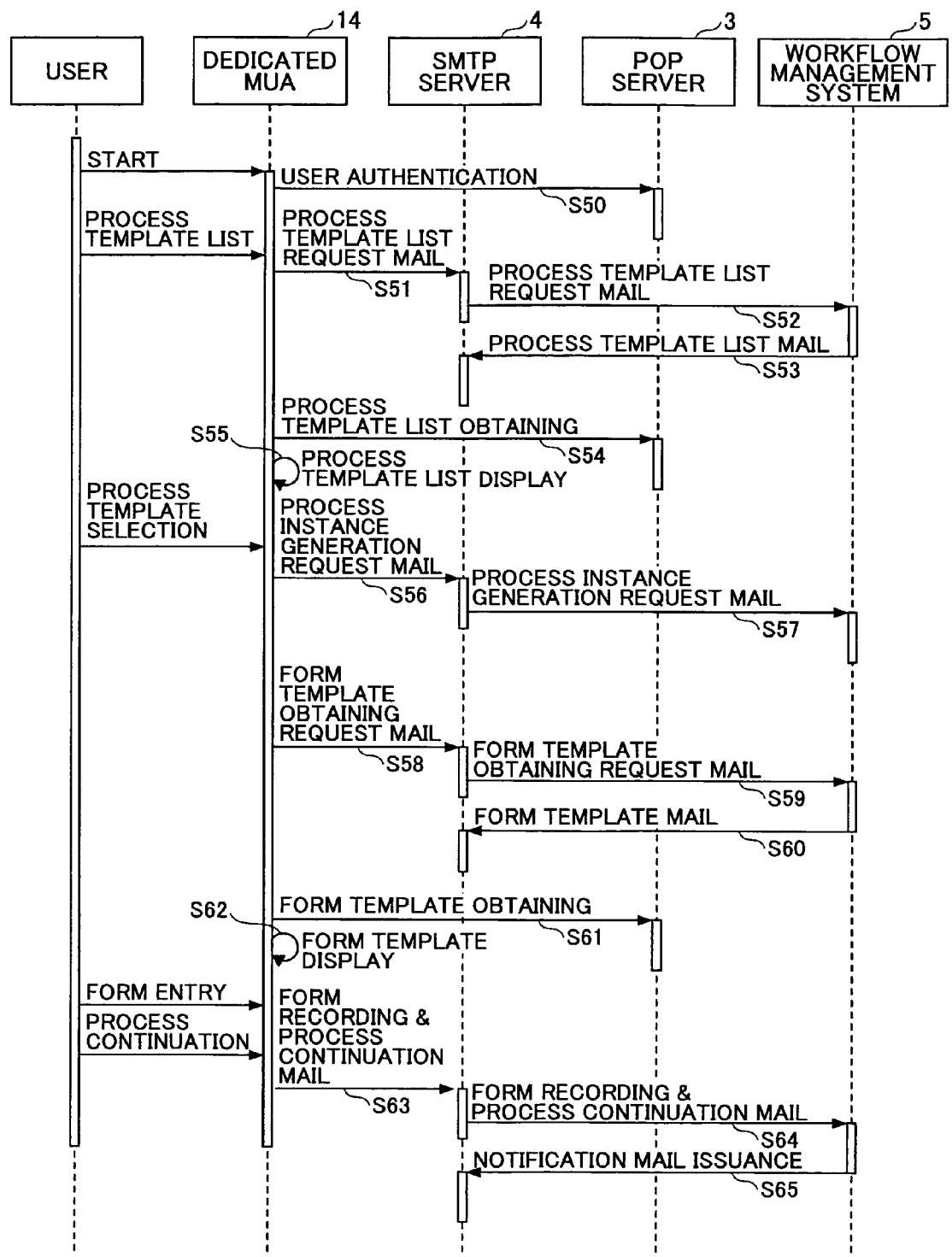
FIG. 19 is a sequence diagram of the start of a workflow according to the second embodiment of the present invention.

Next, a description is given, with reference to FIG. 19, of a sequence relating to the start of a workflow according to the second embodiment. FIG. 19 is a sequence diagram of the start of a workflow according to the second embodiment.

First, a user of the dedicated MUA 14 starts the dedicated MUA 14. Then, in step S50 of FIG. 19, using the mail account of the dedicated MUA 14, the started dedicated MUA 14 transmits a user authentication request including the mail account to the POP server 3, and receives the authentication result.

By performing user authentication using the mail account of the dedicated MUA 14, a workflow-related system can be constructed without installing a new user authentication system (server) in the system.

Next, as described with reference to FIG. 9, the user of the dedicated MUA 14 clicks on "New" on the "File" menu on the screen of the dedicated MUA 14, and then clicks on "Workflow," thereby making a request to obtain a process template list.

When the dedicated MUA 14 determines that the user has clicked on "Workflow" on the screen of the dedicated MUA 14, in step S51, the dedicated MUA 14 provides an e-mail message of a workflow-related process template list search request to the SMTP server 4.

Then, in step S52, the SMTP server 4 provides the process template list search request e-mail message to the workflow management system 5.

Receiving the process template list search request e-mail message, in step S53, the workflow management system 5, in response to the request, searches the workflow DB 6, and provides a process template list e-mail message including a workflow-related process template list that is the search result to the SMTP server 4.

The SMTP server 4 stores the received process template list e-mail message in, for example, the mail DB 7.

In step S54, the dedicated MUA 14 obtains the corresponding process template list e-mail message stored in, for example, the mail DB 7 via the POP server 3.

Then, in step S55, as shown in FIG. 9, the dedicated MUA 14 displays a list of workflow-related processes such as Travel Expense Application, Purchase Application, Proposal Drafting (A), and Proposal Drafting (B) on the screen of the dedicated MUA 14 based on the obtained workflow-related process template list.

Next, the user of the dedicated MUA 14 selects a process template by selecting a process that the user is going to start from the displayed workflow-related process list.

In step S56, the dedicated MUA 14 transmits an e-mail message of a request to generate the instance of the process template selected by the user of the dedicated MUA 14 to the SMTP server 4.

In step S57, the SMTP server 4 provides the process instance generation request e-mail message to the workflow management system 5.

Receiving the process instance generation request e-mail message, the workflow management system 5 generates the instance of the selected process template in response to the request, and stores the generated instance in, for example, the workflow DB 6.

Next, in step S58, the dedicated MUA 14 transmits to the SMTP server 4 an e-mail message of a request to obtain a form template included in the instance of the process template generated by the generation request transmitted in step S56.

In step S59, the SMTP server 4 provides the form template obtaining request e-mail message to the workflow management system 5.

Receiving the form template obtaining request e-mail message, in step S60, the workflow management system 5, in response to the request, obtains the form template included in the generated instance of the process template from, for example, the workflow DB 6, and provides an e-mail message containing the form template to the SMTP server 4.

The SMTP server 4 stores the received form template e-mail message in, for example, the mail DB 7.

In step S61, the dedicated MUA 14 obtains the corresponding form template e-mail message stored in, for example, the mail DB 7 via the POP server 3.

Then, in step S62, the dedicated MUA 14 displays a region (screen) for process creation on the screen of the dedicated MUA 14 based on the obtained form template.

The user of the dedicated MUA 14 enters data relating to process creation or start in the displayed region, and requests the continuation of the process by pressing a CONTINUE PROCESS button or a TRANSMIT button.

Receiving the process continuation request by the user of the dedicated MUA 14, in step S63, the dedicated MUA 14 transmits an e-mail message requesting the recording of a form instance including the data entered by the user of the dedicated MUA 14 and the continuation of the process to the SMTP server 4.

In step S64, the SMTP server 4 provides the e-mail message requesting the form instance recording and the process continuation to the workflow management system 5.

Receiving the e-mail message requesting the form instance recording and the process continuation, in step S65, the workflow management system 5, in response to the request, records the obtained form instance in the corresponding process instance stored in, for example, the workflow DB 6, and issues a notification e-mail message relating to the processing of a corresponding work item to the SMTP server 4.

As shown in FIG. 19, the user of the dedicated MUA 14 can start a workflow using the screen of the dedicated MUA 14.

Figure 20:
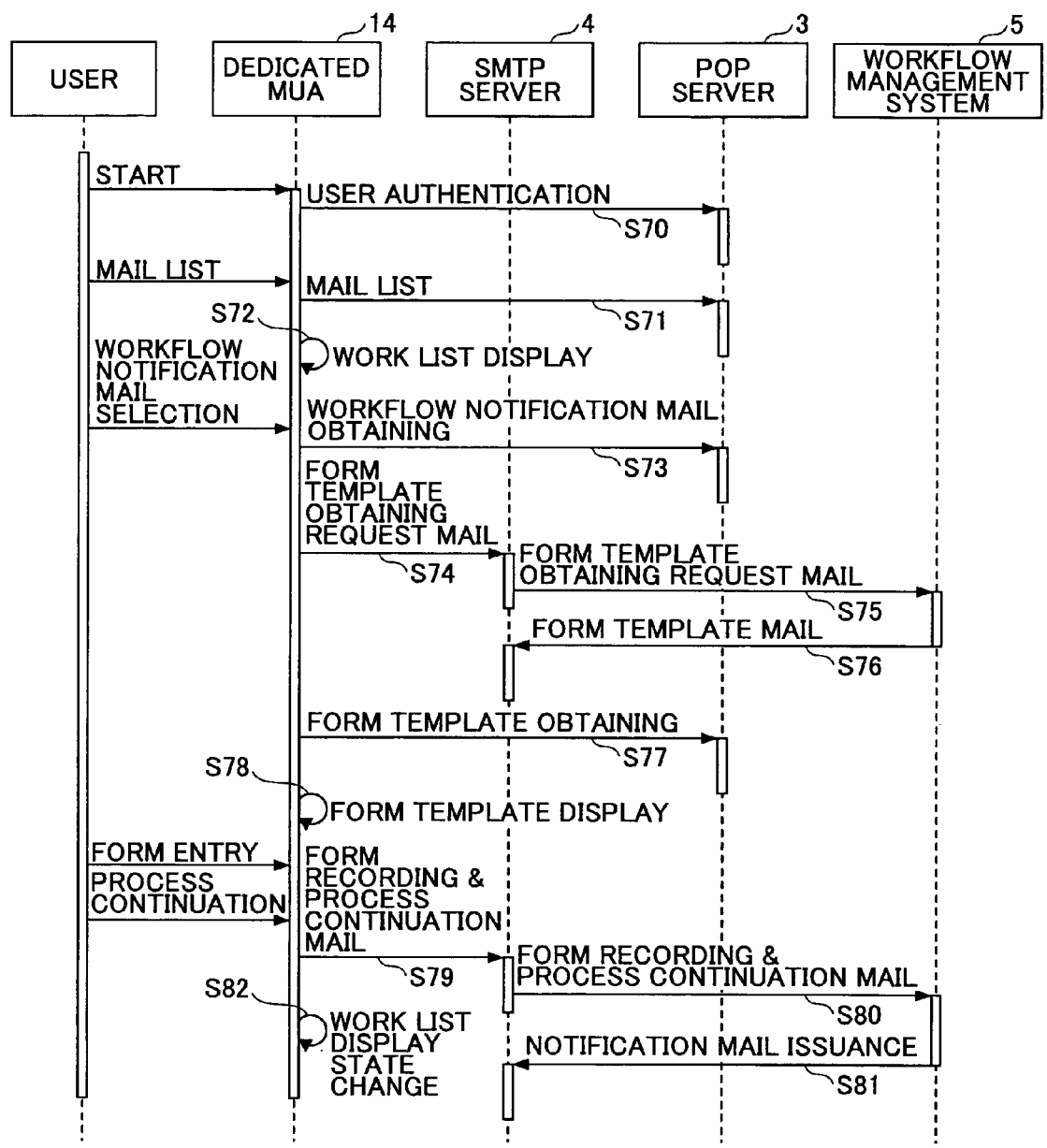
FIG. 20 is a sequence diagram of processing of a workflow according to the second embodiment of the present invention.

Next, a description is given, with reference to FIG. 20, of a sequence relating to processing of a workflow according to the second embodiment. FIG. 20 is a sequence diagram of processing of the workflow.

The user of the dedicated MUA 14 starts the dedicated MUA 14. Then, in step S70 of FIG. 20, using the mail account of the dedicated MUA 14, the started dedicated MUA 14 transmits a user authentication request including the mail account to the POP server 3, and receives the authentication result.

By performing user authentication using the mail account of the dedicated MUA 14, a workflow-related system can be constructed without installing a new user authentication system (server) in the system.

Next, the user of the dedicated MUA 14 makes a request to obtain a mail list. When the dedicated MUA 14 determines that the user of the dedicated MUA 14 has made a request to obtain a mail list, in step S71, the dedicated MUA 14 transmits a mail list obtaining request to the POP server 3, and obtains a mail list.

In step S72, as described with reference to FIGS. 5 through 7, the dedicated MUA 14 displays a work list on the screen of the dedicated MUA 14 based on the obtained mail list. For example, the dedicated MUA 14 refers to a mail header received and stored in, for example, the hard disk 26, and determines whether a corresponding e-mail message is workflow-related. If the dedicated MUA 14 determines that the e-mail message is workflow-related, the dedicated MUA 14 displays a work list on the screen of the dedicated MUA 14 based on the information of the mail header.

The user of the dedicated MUA 14 selects a workflow-related e-mail message from the workflow management system 5 using the screen of the dedicated MUA 14.

In step S73, the dedicated MUA 14 transmits a request to obtain the workflow-related e-mail message selected by the user of the dedicated MUA 14 to the POP server 3, and obtains the corresponding e-mail message.

Next, in step S74, the dedicated MUA 14 transmits to the SMTP server 4 an e-mail message of a request to obtain a form template corresponding to the obtained workflow-related notification e-mail message.

In step S75, the SMTP server 4 provides the form template obtaining request e-mail message to the workflow management system 5.

Receiving the form template obtaining request e-mail message, in step S76, the workflow management system 5, in response to the request, obtains the corresponding form template included in the instance of a corresponding process template from, for example, the workflow DB 6, and provides a form template e-mail message including the obtained form template to the SMTP server 4.

The SMTP server 4 stores the received form template mail in, for example, the mail DB 7.

In step S77, the dedicated MUA 14 obtains the corresponding form template e-mail message stored in, for example, the mail DB 7 via the POP server 3.

In step S78, as described with reference to FIG. 8, the dedicated MUA 14 displays the work item processing region 31 on the screen of the dedicated MUA 14 based on the obtained form template.

The user of the dedicated MUA 14 enters a comment on the displayed region (screen) 31, processes a work item by clicking on an EXAMINE button or a DISAPPROVE button, and requests the continuation of the process.

When the dedicated MUA 14 is requested to continue the process by the user of the dedicated MUA 14, in step S79, the dedicated MUA 14 transmits an e-mail message requesting the recording of a form instance including the comment entered by the user of the dedicated MUA 14 and the continuation of the process to the SMTP server 4.

In step S80, the SMTP server 4 provides the e-mail message of the form instance recording and the process continuation to the workflow management system 5.

Receiving the e-mail message requesting the form instance recording and the process continuation, in step S81, the workflow management system 5, in response to the request, records the obtained form instance in the corresponding process instance stored in, for example, the workflow DB 6, and issues a notification e-mail message relating to the processing of a corresponding work item to the SMTP server 4.

On the other hand, in step S82, the dedicated MUA 14 changes the display state of the work list displayed on the screen of the dedicated MUA 14. For example, the dedicated MUA 14 moves a processed work item from the UNPROCESSED column to the PROCESSED column on the screen of the dedicated MUA 14, or deletes the processed work item from the work list.

By performing processing as shown in FIG. 20, the user of the dedicated MUA 14 can process a workflow using the screen of the dedicated MUA 14.

Third Embodiment

In the first embodiment, the workflow function addition module 10 includes the communication processing part 13, and the workflow function addition module 10 directly communicates with the workflow management system 5 via the communication processing part 13 based on a predetermined protocol such as SOAP. Alternatively, communications with the workflow management server 1 may be performed using the mail function of the MUA 9.

Figure 21:
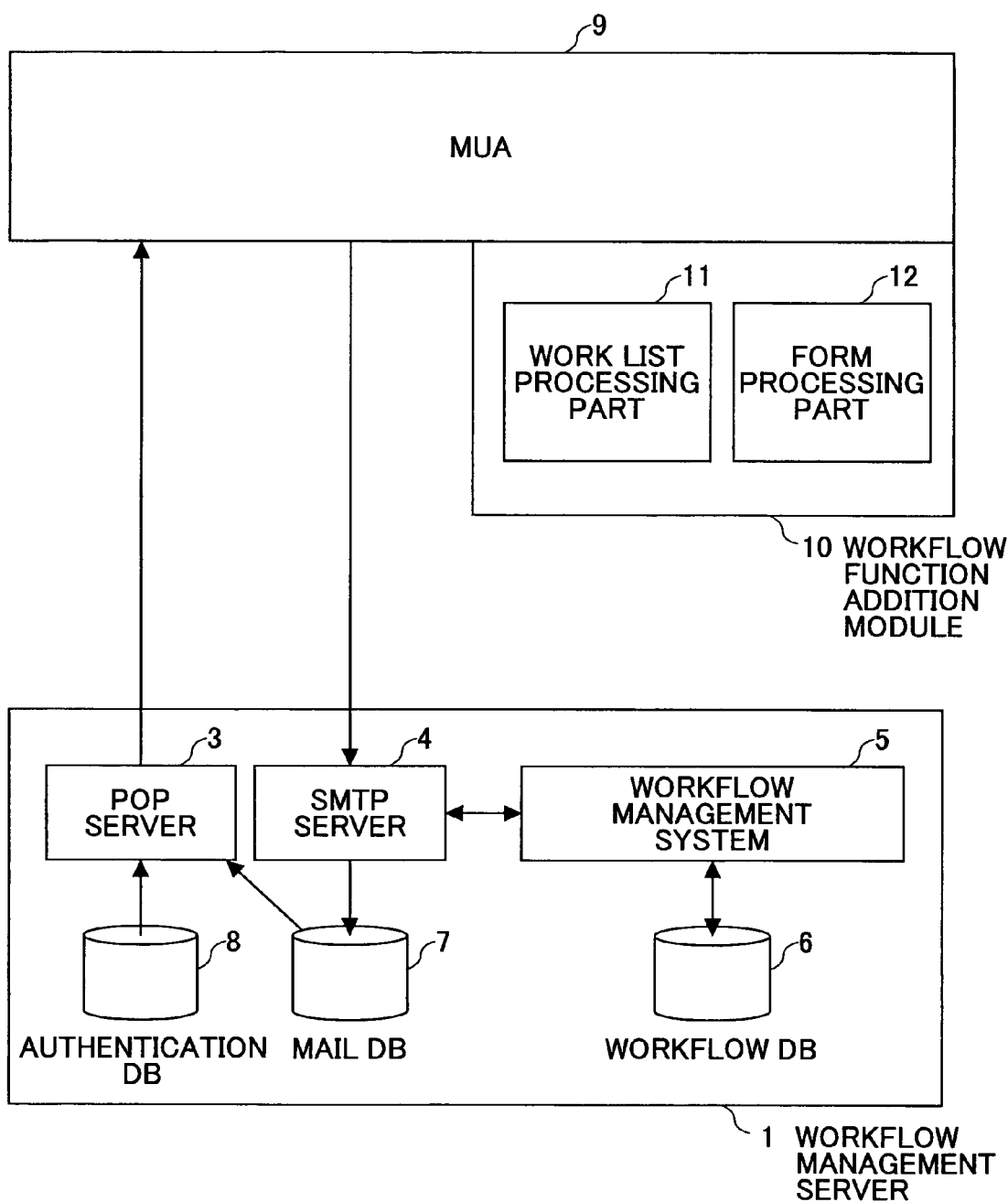
FIG. 21 is a block diagram showing a functional configuration of the system according to a third embodiment of the present invention.

A description is given below, with reference to FIG. 21, of a functional configuration of the system according to a third embodiment of the present invention. FIG. 21 is a block diagram showing the functional configuration of the system according to the third embodiment.

Referring to FIG. 21, the workflow management server 1 includes the POP server 3, the SMTP server 4, the workflow management system 5, the workflow DB 6, the mail DB 7, and the authentication DB 8.

When the workflow management system 5, for example, receives an e-mail message of a process template list search request from the MUA 9 via the SMTP server 4, the workflow management system 5 searches the workflow DB 6, and provides a process template list that is the search result to the MUA 9 via the SMTP server 4.

Further, as shown in FIG. 21, the client PC 2 includes the MUA 9 and the workflow function addition module 10, and the workflow function addition module 10 includes the work list processing part 11 and the form processing part 12.

As described above, the MUA 9 communicates with the workflow management server 1 using its own mail function.

Fourth Embodiment

In the second embodiment, the dedicated MUA 14 communicates with the workflow management server 1 using its mail function. Alternatively, the dedicated MUA 14 may include all the functions of the workflow function addition module 10 shown in the first embodiment (FIG. 4) so as to perform communications with the workflow management system 5 using the communication processing part 13.

Figure 22:
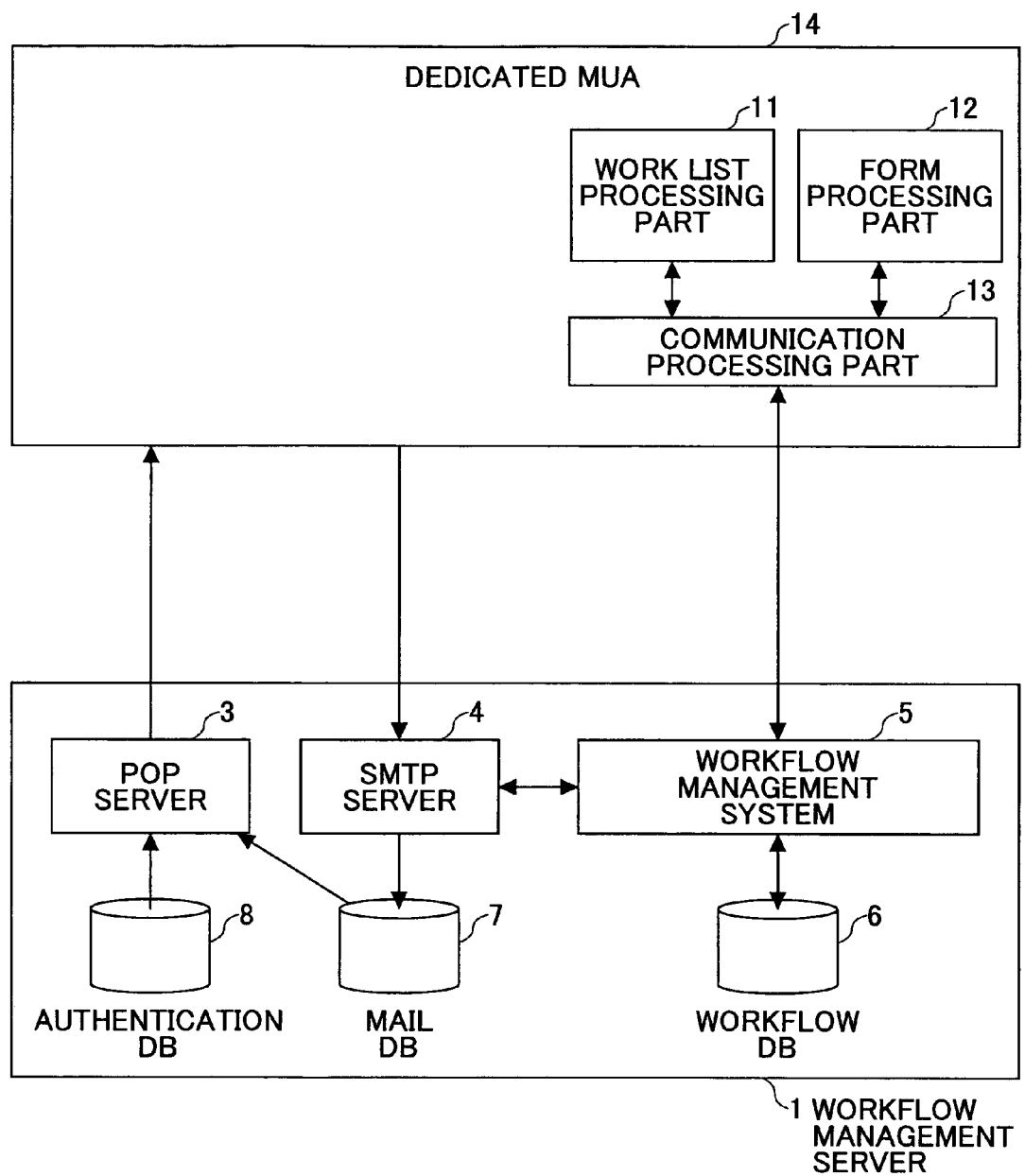
FIG. 22 is a block diagram showing a functional configuration of the system according to a fourth embodiment of the present invention.

A description is given below, with reference to FIG. 22, of a functional configuration of the system according to a fourth embodiment of the present invention. FIG. 22 is a block diagram showing the functional configuration of the system according to the fourth embodiment.

Referring to FIG. 22, the workflow management server 1 includes the POP server 3, the SMTP server 4, the workflow management system 5, the workflow DB 6, the mail DB 7, and the authentication DB 8.

When the workflow management system 5, for example, receives a process template list search request from the communication processing part 13 of the dedicated MUA 14, the workflow management system 5 searches the workflow DB 6, and provides a process template list that is the search result to the dedicated MUA 14 via the communication processing part 13.

Further, as shown in FIG. 22, the client PC 2 includes the dedicated MUA 14, and the dedicated MUA 14 includes the work list processing part 11, the form processing part 12, and the communication processing part 13.

As described above, the dedicated MUA 14 directly communicates with the workflow management system 5 via the communication processing part 13 based on a predetermined protocol such as SOAP.

Fifth Embodiment

In the above-described embodiments, the POP server 3, the SMTP server 4, the workflow management system 5, the workflow DB 6, the mail DB 7, and the authentication DB 8 are included in the same server (the workflow management server 1). As described above, however, all the above-described elements 3 through 8 do not always have to be included in the same server.

In a fifth embodiment, the functions and the configuration of the workflow management server 1 in the above-described embodiments are divided between the workflow management server 1 and a mail server 15.

Figure 23:
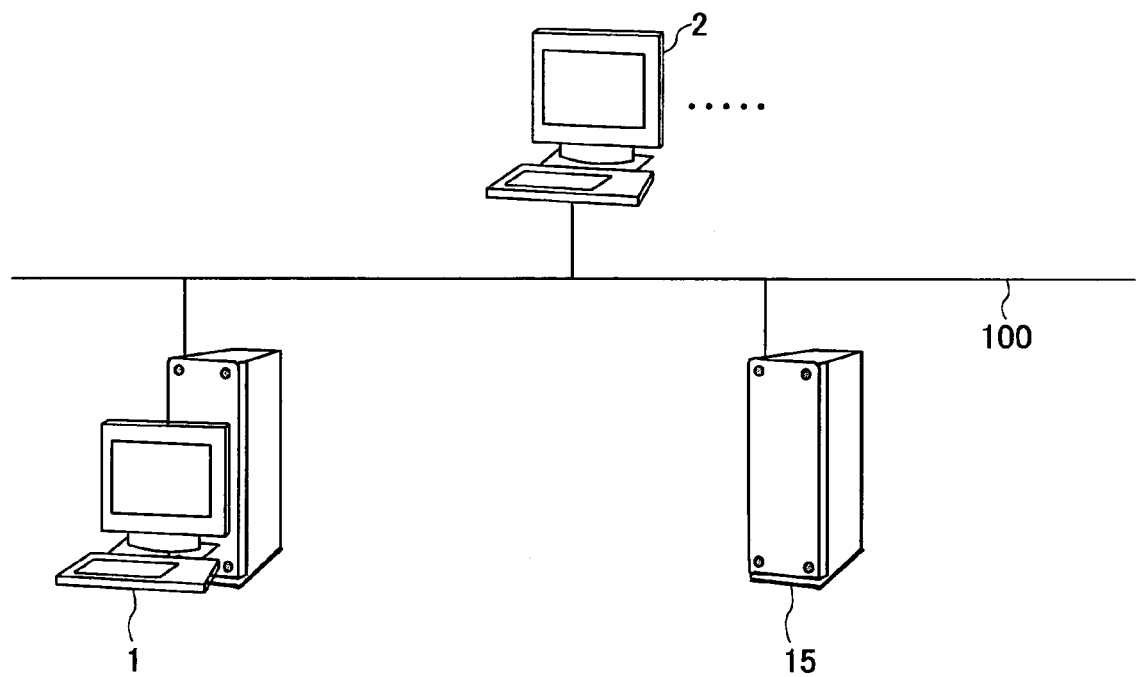
FIG. 23 is a diagram showing a system configuration according to a fifth embodiment of the present invention.

FIG. 23 is a diagram showing a system configuration according to the fifth embodiment of the present invention. The system of FIG. 23 includes the workflow management server 1, the mail server 15, and the client PC(s) 2, which are connected via the network 100. The hardware configuration of the mail server 15 is equal to that of the workflow management server 1 shown in FIG. 3. The processor of the mail server 15 performs processing in accordance with a mail server program (or a POP server program and/or an SMTP server program).

Figure 24:
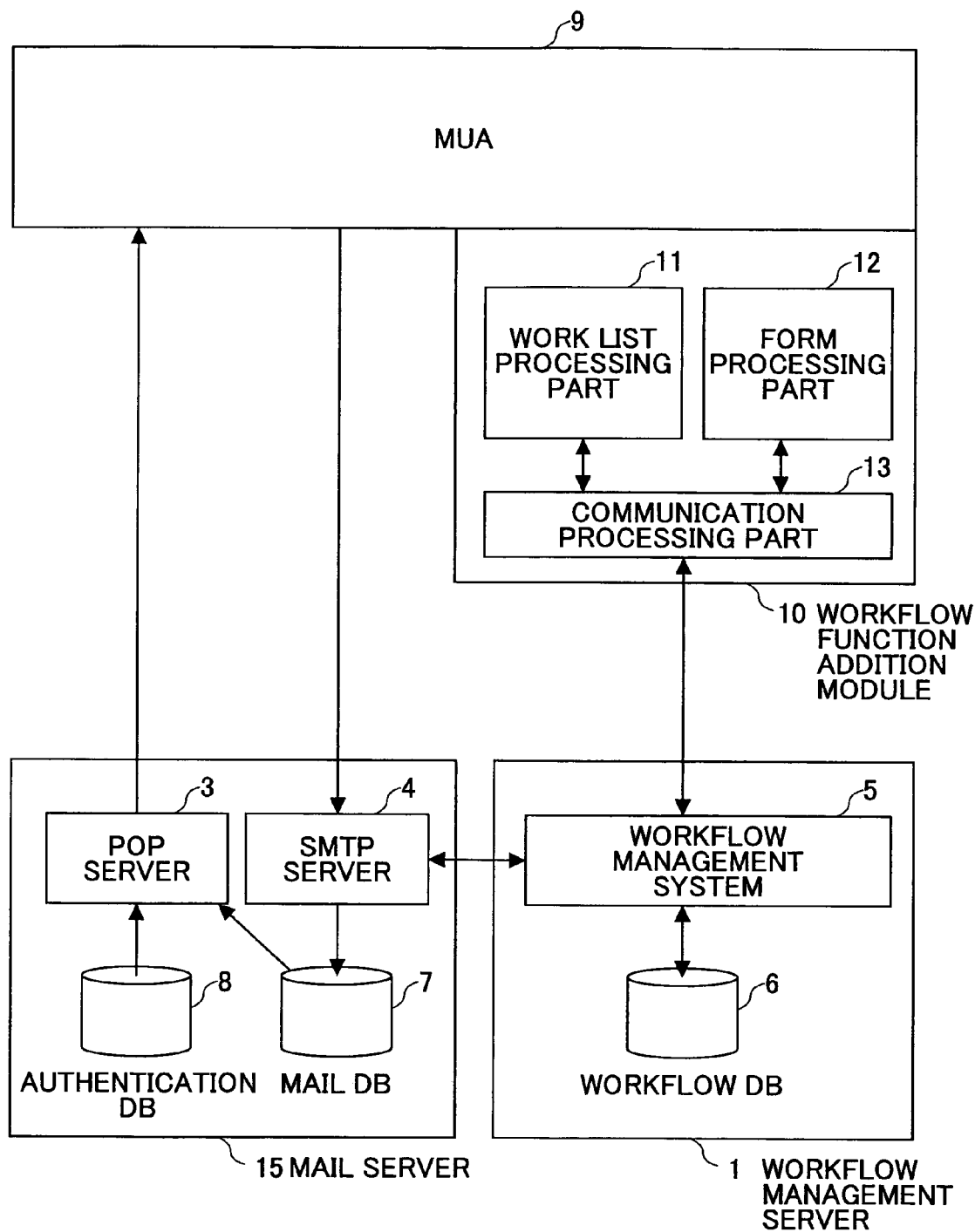
FIG. 24 is a block diagram showing a functional configuration of the system according to the fifth embodiment of the present invention.

Next, a description is given, with reference to FIG. 24, of a functional configuration of the system according to the fifth embodiment of the present invention. FIG. 24 is a block diagram showing the functional configuration of the system according to the fifth embodiment.

Referring to FIG. 24, the workflow management server 1 includes the workflow management system 5 and the workflow DB 6. The mail server 15 includes the POP server 3, the SMTP server 4, the mail DB 7, and the authentication DB 8.

Further, as shown in FIG. 24, the client PC 2 includes the MUA 9 and the workflow function addition module 10. Further, the workflow function addition module 10 includes the work list processing part 11, the form processing part 12, and the communication processing part 13.

As shown in the fifth embodiment, the POP server 3, the SMTP server 4, the workflow management system 5, the workflow DB 6, the mail DB 7, and the authentication DB 8 do not always have to be included in the same server.

The workflow management server 1 may be a workflow management apparatus, and the program thereof may be a workflow management program. The workflow management system 5 may also be a workflow management apparatus, and the program thereof may also be a workflow management program. The MUA 9 may be the e-mail part of the client PC 2, and a program corresponding to the MUA 9 may be an e-mail program. The dedicated MUA 14 may also be the e-mail part of the client PC 2, and a program corresponding to the dedicated MUA 14 may also be an e-mail program.

The present invention is not limited to the specifically disclosed embodiments, and variations and modifications may be made without departing from the scope of the present invention.

The present application is based on Japanese Priority Patent Applications No. 2003-301777, filed on Aug. 26, 2003, and No. 2004-232296, filed on Aug. 9, 2004, the entire contents of which are hereby incorporated by reference.

What is claimed is:

1. A computer-readable recording medium storing a workflow function addition program for causing a computer to execute a method, the method comprising the steps of:

displaying a list of work items on a screen of the computer on a first region within a user interface area of an e-mail program, said e-mail program providing the user interface for a user to send and receive e-mail messages and being stored on the computer;

changing a display state of the list of the work items displayed in said displaying a list of work items; and obtaining a form template from a workflow management system after a user selects one of the displayed work items, said workflow management system is configured to manage a process related to a workflow and is external to the computer; and displaying a second region within the user interface area of the e-mail program for processing the one of the work items on the screen of the computer based on the form template obtained from the workflow management system, wherein a user can edit the one of the work items within the second region by entering data into the form template to complete the one of the work items within the e-mail program user interface area without separately starting an application for workflow management.

2. The computer-readable recording medium as claimed in claim 1, wherein the displaying a list of work items includes displaying the list of the work items on the computer screen in accordance with a time limit for processing of each work item.

3. The computer-readable recording medium as claimed in claim 1, wherein the method further comprises:
obtaining the form template from the workflow management system in response to a notification e-mail message related to a workflow, and the form template being included in an instance of the workflow-related process.

4. The computer-readable recording medium as claimed in claim 3, wherein a header of the workflow-related notification e-mail message includes a field related to the workflow.

5. The computer-readable recording medium as claimed in claim 1, wherein the workflow function addition program is configured to perform user management using a mail account of the e-mail program.

6. The computer-readable recording medium as claimed in claim 1, wherein the method further comprises:
displaying a menu related to a start of a workflow on the screen related to the e-mail program.

7. A computer-readable recording medium storing an e-mail program, wherein:
the e-mail program includes the workflow function addition program as set forth in claim 1.

8. A computer-readable recording medium storing an e-mail program for causing a computer to execute a method, the method comprising
displaying a list of work items on a screen of the computer on a first region within a user interface area of the e-mail program, said e-mail program providing the user interface for a user to send and receive e-mail messages and being stored on the computer;
changing a display state of the list of the work items displayed in said displaying a list of work items;
obtaining a form template from a workflow management system after a user selects one of the displayed work items, said workflow management system is configured to manage a process related to a workflow and is external to the computer; and
displaying a second region within the user interface area of the e-mail program for processing the one of the work items on the screen of the computer based on the form template obtained from a workflow management system, wherein a user can edit the one of the work items within the second region by entering data into the form template to complete the one of the work items within the e-mail program user interface area without separately starting an application for workflow management.

9. The computer-readable recording medium as claimed in claim 8, wherein the displaying a list of work items includes displaying the list of the work items on the screen related to the e-mail program in accordance with a time limit for processing of each work item.

10. The computer-readable recording medium as claimed in claim 8, wherein the method further comprises:
obtaining the form template from the workflow management system in response to a notification e-mail message related to a workflow, and the form template being included in an instance of the workflow-related process.

11. The computer-readable recording medium as claimed in claim 10, wherein a header of the workflow-related notification e-mail message includes a field related to the workflow.

12. The computer-readable recording medium as claimed in claim 8, wherein the method further comprises:
displaying a menu related to a start of a workflow on the screen related to the e-mail program.

13. A computer-readable recording medium storing a workflow management program for causing a computer to execute a method, the method comprising:
providing a form template included in an instance of a process related to a workflow in response to a request from a workflow function addition program stored on an external device to obtain the form template, wherein the form template is related to a list of work items displayed on a screen of the external device on a first region within a user interface area of an e-mail program, said e-mail program providing the user interface for a user to send and receive e-mail messages and being stored on the external device, and the form template includes information regarding one of the work items and allows a user to edit the one of the work items within a second region of the user interface area of the e-mail program by entering data into the form template to complete the one of the work items within the e-mail program user interface area without separately starting an application for workflow management, wherein the workflow addition program submits the request to obtain the form template after the user selects one of the displayed work items; and
recording a form instance including data entered by the user in response to a request from the workflow function addition program to record the form instance.

14. The computer-readable recording medium as claimed in claim 13, wherein the method further comprises:
issuing a notification e-mail message related to processing of a step of the workflow-related process in response to a request from the workflow function addition program to continue the workflow-related process.

15. A computer-readable recording medium storing a workflow management program for causing a computer to execute a method, the method comprising:
providing a form template included in an instance of a process related to a workflow in response to a first e-mail message from an e-mail program stored on an external device, the first e-mail message requesting obtaining of the form template, wherein the form template is configured to display a list of work items on a screen of the external device on a first region within a user interface area of the e-mail program, said e-mail program providing the user interface for a user to send and receive e-mail messages, and the form template includes information regarding one of the work items and allows a user to edit the one of the work items within a second region of the user interface area of the e-mail program by entering data into the form template to complete the one of the work items within the e-mail program user interface area without separately starting an application for workflow management, wherein the e-mail program submits the first e-mail message requesting obtaining the form template after the user selects the one of the work items; and
recording a form instance including data entered by the user in response to a second e-mail message from the e-mail program, the second e-mail message requesting recording of the form instance.

16. The computer-readable recording medium as claimed in claim 15, wherein the method further comprises:
issuing a notification e-mail message related to processing of a step of the workflow-related process in response to a request from the e-mail program to continue the workflow-related process, the request being included in the second e-mail message from the e-mail program.

17. A user terminal unit, comprising:
an e-mail part including a workflow function addition part configured to add a workflow-related function,
wherein the workflow function addition part is configured to display a list of work items on a screen of the user terminal unit on a first region within a user interface area of an e-mail program being stored on the user terminal unit, said e-mail program providing the user interface for a user to send and receive e-mail messages, change a display state of the list of work items, and display a second region within the user interface area of the e-mail program for processing a corresponding one of the work items based on a form template that includes information regarding the one of the work items and is obtained from a workflow management system which is external to the user terminal unit and manages a process related to a workflow, wherein a user can edit the one of the work items within the second region by entering data into the form template to complete the one of the work items within the e-mail program user interface area without separately starting an application for workflow management, and wherein the form template is obtained from the workflow management system after the user selects the one of the work items.

18. A user terminal unit, comprising:
an e-mail part including a work list processing part configured to perform processing related to a list of work items,
wherein the work list processing part is configured to display the list of the work items on a screen of the user terminal unit on a first region within a user interface area of an e-mail program stored on the user terminal unit, said e-mail program providing the user interface for a user to send and receive e-mail messages, change a display state of the list of work items, and display a second region within the user interface area of the e-mail program for processing a corresponding one of the work items based on a form template that includes information regarding the one of the work items and is obtained from a workflow management system which is external to the user terminal unit and manages a process related to a workflow, wherein a user can process the one of the work items within the second region by entering data into the form template to complete the one of the work items within the e-mail program user interface area without separately starting an application for workflow management, and wherein the form template is obtained from the workflow management system after the user selects the one of the work items.

19. A workflow management apparatus, comprising:
a workflow management part configured to manage a process related to a workflow,
the workflow management part configured to provide a form template included in an instance of the workflow-related process in response to a request from a workflow function addition part of a user terminal unit, which is external to the workflow management apparatus, to obtain the form template,
wherein the form template is configured to display a list of work items displayed on a screen of the user terminal unit on a first region of a user interface area of an e-mail program stored on the user terminal unit, said e-mail program providing the user interface for a user to send and receive e-mail messages, and the form template includes information regarding one of the work items and allows a user to edit the one of the work items within a second region of the user interface area of the e-mail program by entering data into the form template to complete the one of the work items within the e-mail program user interface area without separately starting an application for workflow management,
the workflow addition part is configured to submit the request to obtain the form template after the user selects the one of the work items, and
the workflow management part is configured to record a form instance including data entered by the user in response to a request from the workflow function addition part to record the form instance.

20. A workflow management apparatus, comprising:
a workflow management part configured to manage a process related to a workflow,
and in response to a first e-mail message received from a transmission server for e-mail transmission, the first e-mail message requesting obtaining of a form template, the workflow management part transmits a second e-mail message including the form template to the transmission server, the form template being included in an instance of the workflow-related process,
wherein the form template is related to a list of work items displayed on screen of an external device on a first region of a user interface area of an e-mail program stored on the external device, said e-mail program providing the user interface for a user to send and receive e-mail messages, and the form template includes information regarding one of the work items and allows a user to edit the one of the work items within the screen of the external device on a second region of the user interface area of the e-mail program by entering data into the form template to complete the one of the work items within the e-mail program user interface area without separately starting an application for workflow management, and
the first e-mail message is sent after the user selects the one of the work items.

21. A method of processing a workflow in a user terminal unit including an e-mail part and a workflow function addition part, the method comprising:
the workflow function addition part displaying a list of work items on a screen of the user terminal unit on a first region within a user interface area of an e-mail program stored on the user terminal unit, said e-mail program providing the user interface for a user to send and receive e-mail messages;
the workflow function addition part changing a display state of the list of the work items displayed in said displaying a list of work items; and
the workflow function addition part displaying a second region within the user interface of the e-mail program for processing a corresponding one of the work items based on a form template that includes information regarding the one of the work items and is obtained from a workflow management system which is external to the user terminal unit and manages a process related to a workflow,
wherein a user can edit the one of the work items within the second region by entering data into the form template to complete the one of the work items within the e-mail program user interface area without separately starting an application for workflow management, and the form template is obtained from the workflow management system after the user selects the one of the work items.

22. A method of processing a workflow in a user terminal unit including an e-mail part, wherein the e-mail part includes a work list processing part configured to perform processing related to a list of work items and the method comprises:

the work list processing part displaying the list of the work items on a screen of the user terminal unit on a first region within a user interface area of an e-mail program stored on the user terminal unit, said e-mail program providing the user interface for a user to send and receive e-mail messages;

the work list processing part changing a display state of the list of the work items displayed in said displaying a list of work items; and the work list processing part displaying a second region within the user interface of the e-mail program for processing a corresponding one of the work items based on a form template that includes information regarding the one of the work items and is obtained from a workflow management system which is external to the user terminal unit and manages a process related to a workflow, wherein a user can edit the one of the work items within the second region by entering data into the form template to complete the one of the work items within the e-mail program user interface area without separately starting an application for workflow management, and the form template is obtained from the workflow management system after the user selects the one of the work items.

23. A method of managing a workflow in a workflow management apparatus managing a process related to the workflow, the method comprising:

providing a form template included in an instance of the workflow-related process in response to a request from a workflow function addition part of a user terminal unit, which is external to the workflow management apparatus, to obtain the form template, wherein the form template is configured to display a list of work items on a screen of the user terminal unit on a first region within a user interface area of an e-mail program, said e-mail program providing the user interface for a user to send and receive e-mail messages, and the form template includes information regarding one of the work items and allows a user to edit one of the work items within a second region of the user interface area of the e-mail program by entering data into the form template to complete the one of the work items within the e-mail program user interface area without separately starting an application for workflow management, wherein the workflow function addition part transmits the request to obtain the form template after the user selects the one of the work items; and recording a form instance including data entered by the user in response to a request from the workflow function addition part to record the form instance.

24. A method of managing a workflow in a workflow management apparatus managing a process related to the workflow, the method comprising the steps of:

providing a form template included in an instance of the workflow-related process in response to a first e-mail message from an e-mail part of a user terminal unit, which is external to the workflow management apparatus, the first e-mail message requesting obtaining of the form template, wherein the form template is configured to display a list of work items on a screen of the user terminal unit on a first region within a user interface of an e-mail program stored on the user terminal unit, said e-mail program providing the user interface for a user to send and receive e-mail messages, and the form template includes information regarding one of the work items and allows a user to edit one of the work items within a second region of the user interface area of the e-mail program by entering data into the form template to complete the one of the work items within the e-mail program user interface area without separately starting an application for workflow management, wherein the e-mail part transmits the first e-mail message after the user selects the one of the work items for editing; and recording a form instance including data entered by the user in response to a second e-mail message from the e-mail part, the second e-mail message requesting recording of the form instance.

25. The computer-readable recording medium as claimed in claim 1, wherein the method further comprises:

transmitting an e-mail message requesting a recording of a form instance including the data entered into the region to a workflow management system.

* * * * *

UNITED STATES PATENT AND TRADEMARK OFFICE
CERTIFICATE OF CORRECTION

PATENT NO. : 7,587,677 B2
APPLICATION NO. : 10/921340
DATED : September 8, 2009
INVENTOR(S) : Yamamoto et al.

It is certified that error appears in the above-identified patent and that said Letters Patent is hereby corrected as shown below:

On the title page, Item (75), the inventors' information is incorrect. Item (75) should read:

-- (75) Inventors:   Kensaku Yamamoto, Saitama (JP);
Satosi Imago, Kanagawa (JP);
Hiroyasu Kurose, Tokyo (JP) --

Signed and Sealed this

Twenty-seventh Day of October, 2009

David J. Kappos
*Director of the United States Patent and Trademark Office*